(12) United States Patent
Morita et al.

(10) Patent No.: US 6,827,645 B2
(45) Date of Patent: Dec. 7, 2004

(54) GAME PROCESSING APPARATUS, GAME PROCESSING METHODS AND RECORDING MEDIA

(75) Inventors: Masamoto Morita, Tokyo (JP); Akiyoshi Shinpo, Tokyo (JP); Akira Nishino, Tokyo (JP); Tooru Ohara, Tokyo (JP); Shuntarou Tanaka, Tokyo (JP); Yuuichi Matsuoka, Tokyo (JP)

(73) Assignee: Kabushiki Kaisha Sega Enterprises, Tokyo (JP)

( * ) Notice: Subject to any disclaimer, the term of this patent is extended or adjusted under 35 U.S.C. 154(b) by 137 days.

(21) Appl. No.: 10/055,176
(22) Filed: Jan. 25, 2002
(65) Prior Publication Data

US 2002/0094854 A1 Jul. 18, 2002

Related U.S. Application Data

(63) Continuation of application No. 08/947,024, filed on Oct. 8, 1997, now Pat. No. 6,354,939.

(30) Foreign Application Priority Data

Oct. 9, 1996 (JP) .............................. 8-268978
Jan. 9, 1997 (JP) ................................ 9-2463

(51) Int. Cl.[7] .......................... A63F 13/00; A63F 9/24; G06F 17/00; G06F 155/00; A63B 71/00
(52) U.S. Cl. ....................... 463/9; 463/1; 463/2; 463/5; 463/7; 463/23; 463/30; 463/43; 273/148 B; 700/90; 700/91; 700/92
(58) Field of Search ............................... 463/1, 2, 5, 7, 463/9, 23, 30–38, 42–47; 700/90–92; 273/148 R, 148 B; 345/418, 581, 589, 591, 649, 655, 672, 678, 681

(56) References Cited

U.S. PATENT DOCUMENTS 4,182,514 A   1/1980 Magid et al. ............... 273/237

5,265,888 A   11/1993 Yamamoto et al. ..... 273/434 X
5,316,343 A   5/1994 Waldhoff .................. 283/70 X (List continued on next page.)

FOREIGN PATENT DOCUMENTS

JP          7-178244         7/1995

OTHER PUBLICATIONS

Panasonic 3DO's Bust–A–Move, TAITO Corporation (1995).
A notice of rejection of an Office Action dated Feb. 20, 2001, from the Japanese Patent Office and an English abstract of the Office Action.
Gamest—Video Game Magazine (Mar. 30, 1995).
"A Book for Enjoying a Hundredfold Playing the Supper Puyo Puyo 2 + Remix," pp. 6 and 14, T2 Publishing Co. Ltd., May 10, 1996.

*Primary Examiner*—A. L. Wellington
*Assistant Examiner*—Binh-An D. Nguyen
(74) *Attorney, Agent, or Firm*—Finnegan, Henderson, Farabow, Garrett & Dunner, L.L.P.

(57) ABSTRACT

Provides a game processing apparatus capable of getting players more excited about playing games.

For that reason, the game processing apparatus of the present invention processes games on the basis of players' operating signals, and is equipped with processing circuits (10), which process the above-mentioned games on the basis of operating signals supplied from input devices (2b) operated by the players, and which generate the image data for these games. When an operating signal equivalent to a player's victory declaration is input from an input device (2b), the processing circuits (10) process subsequent operating signals input by the player as invalid signals until a prescribed condition is achieved.

12 Claims, 27 Drawing Sheets

U.S. PATENT DOCUMENTS

| | | | |
|---|---|---|---|
| 5,401,031 A | 3/1995 | Kuna et al. ................. | 273/265 |
| 5,415,411 A | 5/1995 | Peterson ................. | 273/237 X |
| 5,601,487 A * | 2/1997 | Oshima et al. ................ | 463/4 |
| 5,634,850 A * | 6/1997 | Kitahara et al. .............. | 463/33 |
| 5,641,288 A * | 6/1997 | Zaenglein, Jr. .............. | 434/21 |
| 5,680,534 A | 10/1997 | Yamato et al. .......... | 395/173 X |
| 5,827,120 A | 10/1998 | Kikuchi et al. ........... | 436/40 X |
| 5,913,310 A * | 6/1999 | Brown ...................... | 128/897 |

* cited by examiner

FIG.7
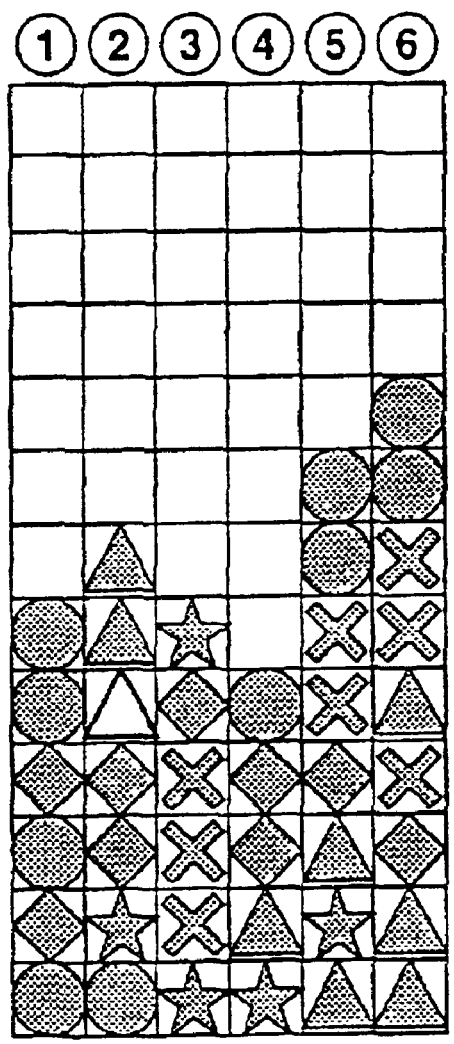
FRASH INITIATED
WHEN A DROPS DOWN

LINE #

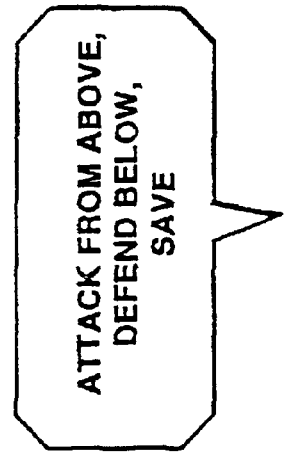
FIG.15 — ATTACK FROM ABOVE, ATTACK FROM BELOW, SAVE
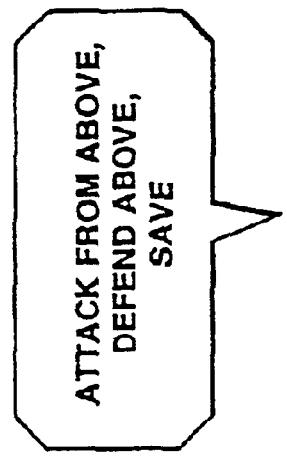
FIG.16 — ATTACK FROM ABOVE, DEFEND ABOVE, SAVE
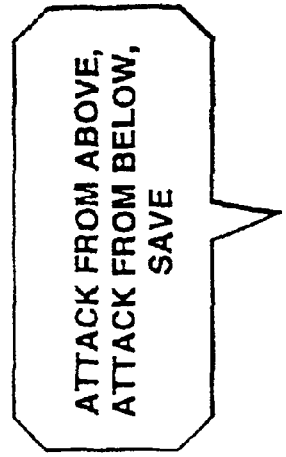
FIG.17 — ATTACK FROM ABOVE, DEFEND BELOW, SAVE
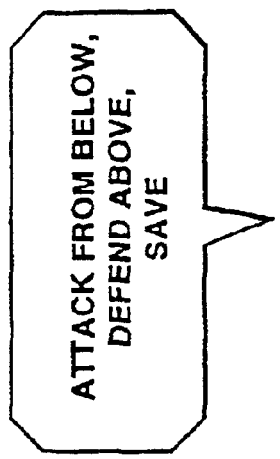
FIG.18 — DEFEND ABOVE, DEFEND BELOW, SAVE
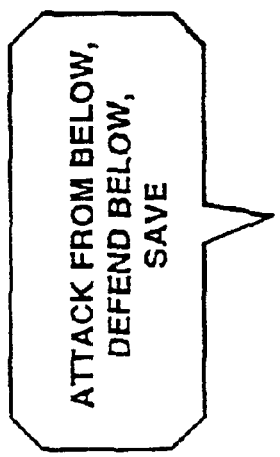
FIG.19 — ATTACK FROM BELOW, DEFEND BELOW, SAVE
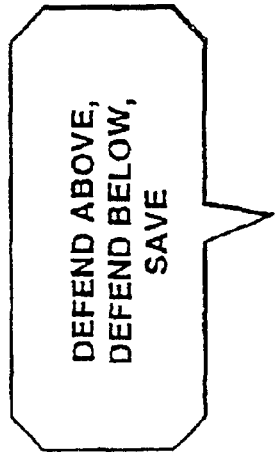
FIG.20 — ATTACK FROM BELOW, DEFEND ABOVE, SAVE FIG.21
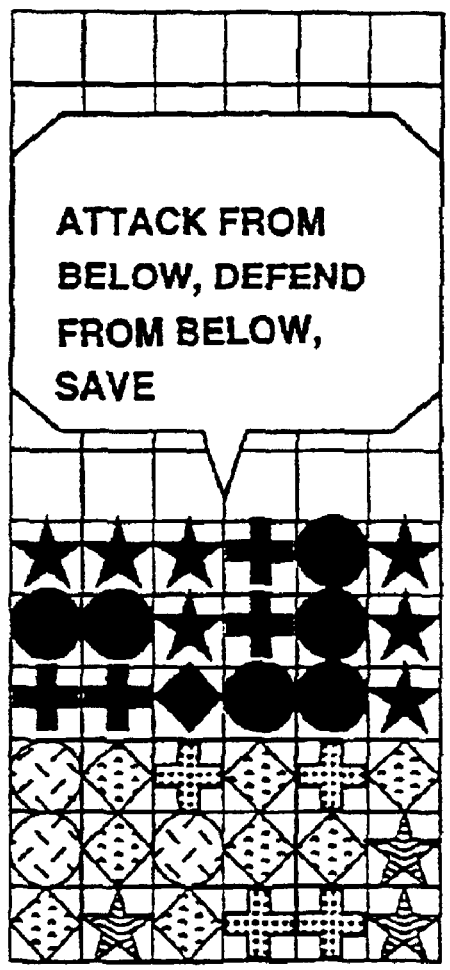
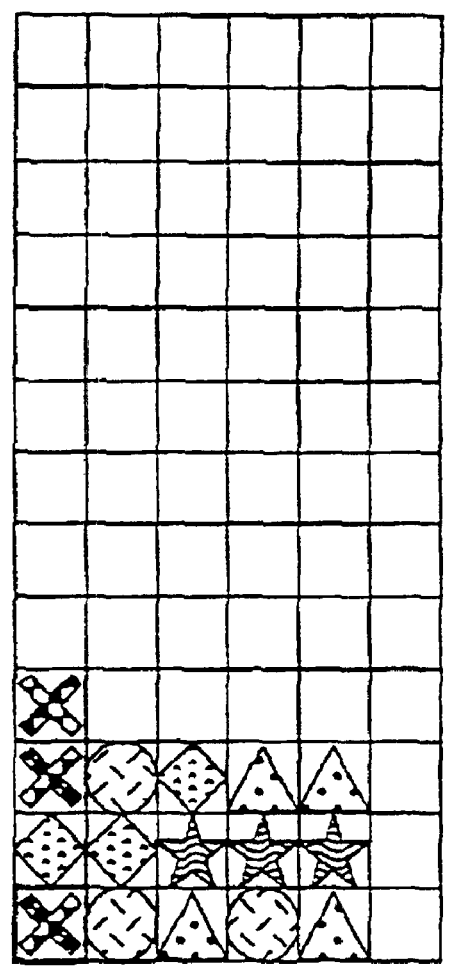

FIG.22
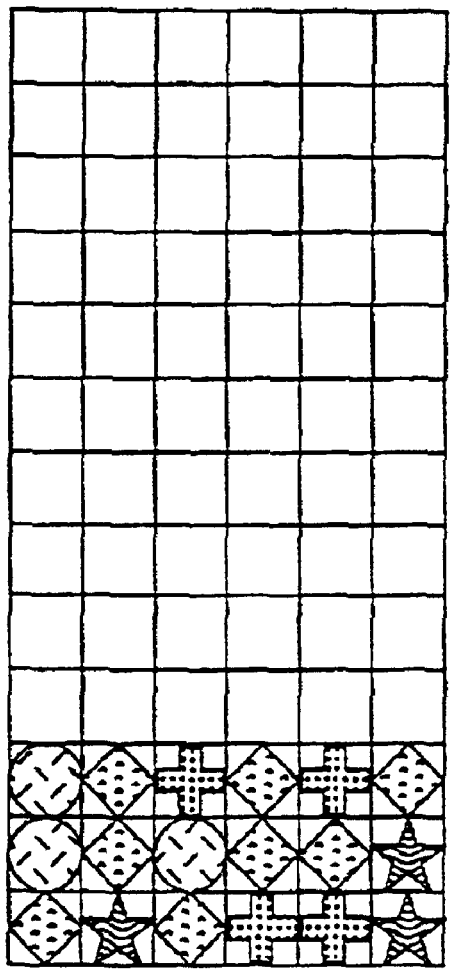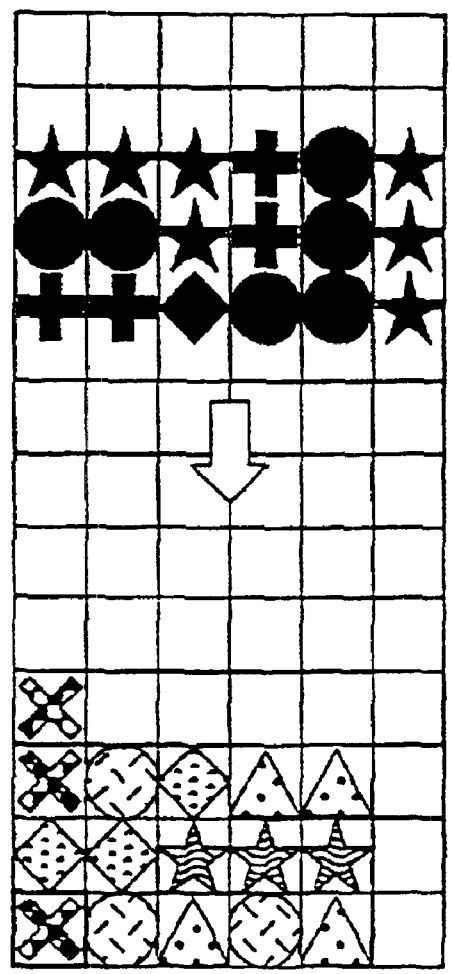

CA:PLAYING AREA
BG:BACKGROUND AREA
W:DISPLAY AREA

FIG.34
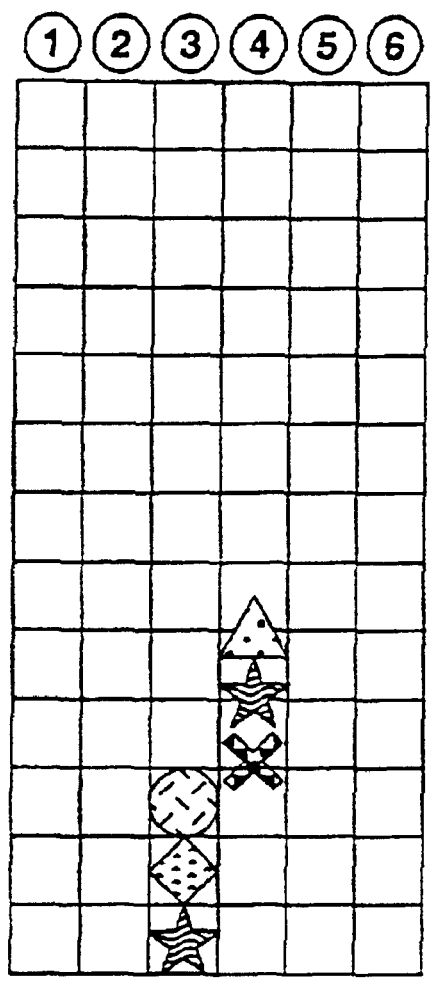
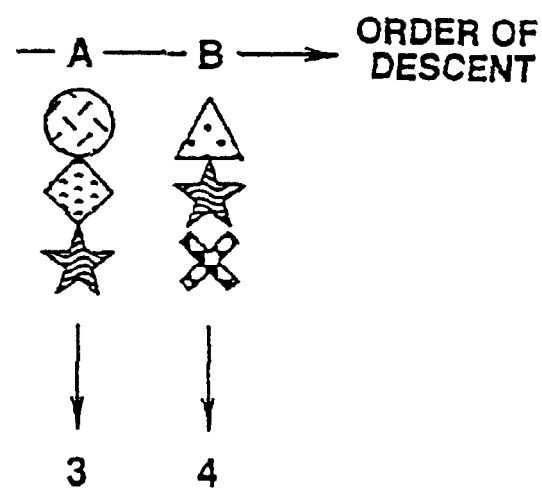

FIG.35
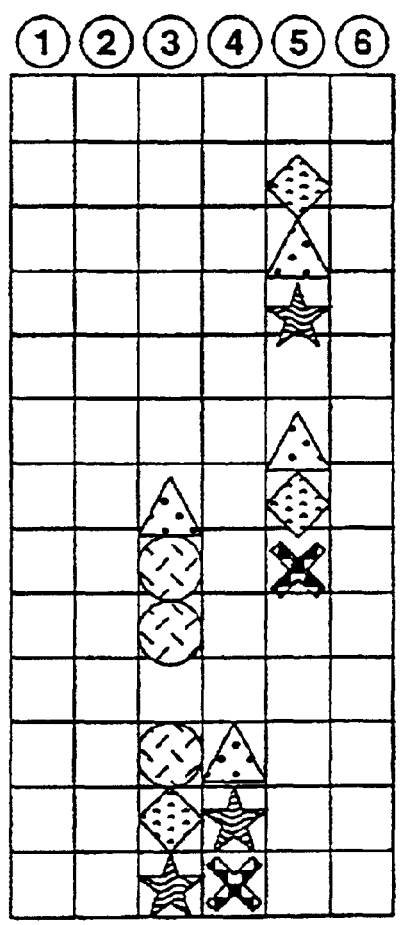
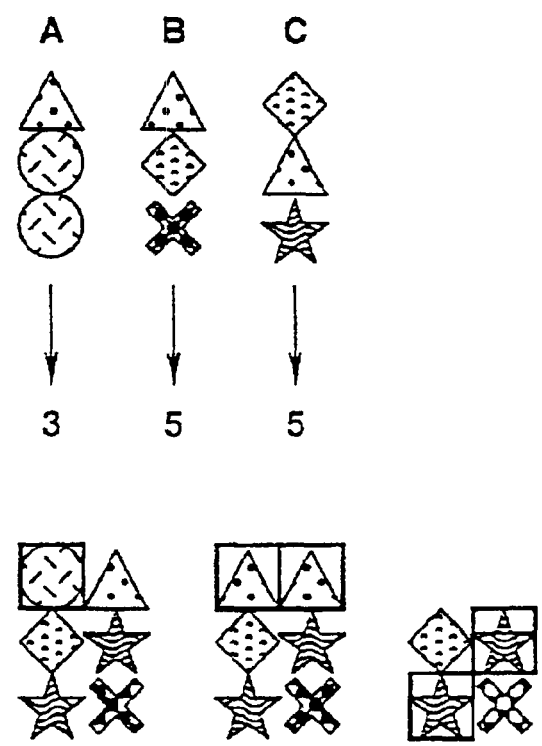

GAME PROCESSING APPARATUS, GAME PROCESSING METHODS AND RECORDING MEDIA

This is continuation of application Ser. No. 08/947,024, filed Oct. 8, 1997, U.S. Pat. No. 6,354,939 which is incorporated herein by reference.

TECHNICAL FIELD

The present invention relates to a game processing apparatus, and more particularly to a new game display technology capable of heightening the interest level of conventional games, and increasing the excitement of the players for a genre of games called battle games in which two players battle one another.

BACKGROUND ART

A game processing apparatus uses a computer to process data and images in accordance with game program data supplied on a CD-ROM or other storage media. The players use input devices connected to the computer to supply operating signals to the computer.

Among the games provided via game processing apparatus is a genre called battle games, whereby two or more players battle one another by manipulating characters displayed on the screen. The best known of the battle games are the fighting games, whereby characters resembling human beings are manipulated to fight one another in hand-to-hand combat, and the battle puzzle games, whereby the players manipulate blocks that descend from the top of the screen, attacking their opponents by lining these blocks up in accordance with a predetermined condition.

The above-described battle games first gained widespread popularity around 1989, and numerous titles have been put out to date, all of which have tended to resemble one another as far as screen configuration and execution are concerned. To ensure that players do not tire of these games, it has become necessary to add new executions and functions.

DISCLOSURE OF THE INVENTION

Therefore, an object of the present invention is to provide game display technology capable of increasing the tension and level of excitement of the players by displaying images that provide more visual effects than conventional battle-type puzzle games.

That is, a first aspect of the present invention is to provide a game capable of increasing the excitement of the players by adding operational restrictions when one of the players makes a victory declaration.

A second aspect of the present invention is to provide games capable of increasing the excitement of the players by making it possible for them to compete against the short overall operation time when a game stage is repeated.

A third aspect of the present invention is to provide games capable of increasing the excitement of the players by establishing heretofore non-existent cooperative relationships when three or more playing areas are displayed.

A fourth aspect of the present invention is to provide games capable of increasing the excitement of the players by effectively changing the background image in accordance with the operating conditions.

A fifth aspect of the present invention is to provide games capable of increasing the excitement of the players by making it possible for players to select the processing mode on their own.

A sixth aspect of the present invention is to provide games capable of increasing the excitement of the players by altering the points earned by the disappearance of blocks.

A seventh aspect of the present invention is to provide games capable of increasing the excitement of the players by characterizing each stage of the game.

An eighth aspect of the present invention is to provide games capable of increasing the excitement of the players by making it possible to warn one's opponent of a pending attack.

The invention that solves for the first task described above is a game processing apparatus that processes a game on the basis of players' operating signals, this game processing apparatus being equipped with processing circuits, which process the above-mentioned game based on operating signals supplied by input devices operated by the players, and which generate the image data for this game, and when an operating signal equivalent to a player's declaration of victory is input from the above-described input devices, the above-described processing circuits process subsequent operating signals input by that player as invalid signals until a predetermined condition has been met.

The invention that solves for the second task described above is a game processing apparatus, which processes a game, the stages of which are repeated a plurality of times based on operating signals, this game processing apparatus being equipped with processing circuits, which process the above-mentioned game based on operating signals supplied by input devices operated by the players, and which generate the image data for this game, and when the above-described processing circuits make a judgement as to whether or not the final stage of the game is over, and determine that the final stage is over, they calculate the number of points corresponding to the elapsed time from the start of the initial stage of the game until the completion of the above-mentioned final stage, and count these as the points earned for the entire game.

The invention that solves for the third task described above is a game processing apparatus that simultaneously displays a plurality of playing areas, where the game is processed based on independent operating signals, this game processing apparatus being equipped with processing circuits, which process the above-mentioned game based on a plurality of operating signals, including operating signals supplied by input devices operated by the players, and which generate the image data for displaying the above-mentioned playing areas, and the above-described processing circuits generate image data for displaying at least three playing areas, which are manipulated based on the above-mentioned plurality of operating signals, and prior to starting the game, out of those plurality of playing areas described above, the processing circuits interrelate those playing areas which will form cooperative relationships with each other, and change the processing of the game in playing areas where cooperating relationships have not been formed based on whether or not the results of operations in any of the playing areas where cooperating relationships have been formed meet a predetermined condition.

The invention that solves for the fourth task described above is a game processing apparatus that processes a game which displays display images arranged in the playing areas and background area, this game processing apparatus being equipped with processing circuits, which generate image data in such a way that the images in the playing areas where the above-mentioned game is processed based on operating signals supplied by input devices operated by the players are superimposed on a background image controlled independently from the concerned playing area images, and this background image is visible, and the above-described processing circuits generate image data that changes the above-described background image in accordance with whether or not the results of operations in the playing areas processed based on the above-mentioned operating signals meet a predetermined condition.

By virtue of the present invention, the above-described processing circuits process games in a plurality of playing areas based on mutually independent operating signals, which include operating signals supplied from the above-mentioned input devices, and generate image data that changes the method used to display the above-described background image according to whether a playing area, wherein the results of operations based on the above-mentioned operating signals meet the above-mentioned condition, corresponds to any of the above-described plurality of playing areas.

By virtue of the present invention, the above-described processing circuits change the above-described background image display method so that the locus of movement of the above-described playing areas relative to the above-described background image is similar to the locus of movement of an elastic object that repeatedly jumps up and down on the ground.

By virtue of the present invention, the above-described processing circuits change the above-described background image display method so as to change the color of the above-described background image in accordance with whether or not the results of operations based on the above-mentioned operating signals meet the above-mentioned condition.

By virtue of the present invention, the above-described processing circuits change the above-described background image display method based on color change characteristics for color tone processing stipulated in advance for a plurality of primary colors that determine the color of images, and on color change characteristics stipulated for the chromaticness of each of the above-mentioned primary colors, and the color change characteristics for the chromaticness of each of the above-mentioned primary colors are determined based on color specific data that indicates the color change characteristics of the chromaticness of a primary color from the time color change commences until the time color change is complete, and on color specific data that indicates the different color change characteristics for the chromaticness of each primary color through the change of different chromaticness levels from an achromatic at the commencement of color change until an achromatic is once again achieved upon the completion of color change.

The invention that solves for the fifth task described above is a game processing apparatus that simultaneously displays a plurality of playing areas, within which a game is processed based on independent operating signals, this game processing apparatus being equipped with processing circuits, which process the above-mentioned game based on a plurality of operating signals, including operating signals supplied by input devices operated by the players, and which generate image data for displaying the above-described playing areas, and the above-described processing circuits generate image data that displays a plurality of options capable of being selected by the operator according to whether or not the results of the players' manipulations in the playing areas processed based on the above-mentioned operating signals meet one or more predetermined conditions.

By virtue of the present invention, the above-described processing circuits hold in advance a plurality of the above-mentioned conditions determined in accordance with the processing of the game, tally points in accordance with whether the processing of the game in the above-described playing area meets any of the plurality of conditions mentioned above, and generate image data that displays a plurality of options based on the number of points scored.

The invention that solves for the sixth task described above is a game processing apparatus that makes blocks disappear, this game processing apparatus being equipped with processing circuits, which process the above-mentioned game based on operating signals supplied by input devices operated by the players, and which generate the image data for this game, and the above-mentioned processing circuits determine the score based on the location from which the above-mentioned blocks disappeared.

The invention that solves for the seventh task described above is a game processing apparatus that processes a game, the stages of which are repeated a plurality of times based on operating signals, this game processing apparatus being equipped with processing circuits, which process the above-mentioned game based on operating signals supplied by input devices operated by the players, and which generate the image data for this game, and each time an above-mentioned stage commences, the above-mentioned processing circuits select from among a plurality of types of characters those characters that correspond to that stage of the game, and when a new character is selected at a new stage, the processing circuits change the processing of the concerned stage of the game in accordance with how many times a character of the same type as the above-mentioned character has been selected prior to that.

By virtue of the present invention, the above-described processing circuits change the degree of difficulty of the game in accordance with the above-mentioned characters.

The invention that solves for the eighth task described above is a game processing apparatus for a plurality of players to do battle, this game processing apparatus being equipped with processing circuits, which process the above-mentioned game based on a plurality of operating signals supplied by a plurality of input devices operated by the players, and which generate the image data for this game, and when a player launches an attack on an opponent based on operating signals supplied by the above-mentioned input devices, the above-described processing circuits generate image data for warning the opposing player of the attack in advance.

Also, the recording media for the present invention are media on which information (primarily digital data and programs) are recorded by some physical means, and which are capable of executing specified functions on computers, dedicated processors and other processing devices. In other words, this can be any media that downloads programs to a computer by some means or another, and which executes specified functions. For example, this includes floppy disks, hard disks, magnetic tape, magneto-optical disks, CD-ROM, DVD, ROM cartridges, RAM memory cartridges equipped with back-up batteries, flash memory cartridges and non-volatile RAM cartridges.

Systems that receive data transmitted by a host computer via wired or radio communications circuits (public telephone lines, dedicated data communications circuits, satellite circuits) are also included. The so-called Internet is included among the recording media referred to here.

BRIEF DESCRIPTION OF THE DRAWINGS

FIG. 7 depicts a diagram explaining an example of a screen display for flash processing (Part 1);

FIG. 15 depicts an example of an options list display (Part 1);

FIG. 16 depicts an example of an options list display (Part 2);

FIG. 17 depicts an example of an options list display (Part 3);

FIG. 18 depicts an example of an options list display (Part 4);

FIG. 19 depicts an example of an options list display (Part 5);

FIG. 20 depicts an example of an options list display (Part 6);

FIG. 21 depicts an example of playing areas and a list of options displayed on a game screen;

FIG. 22 depicts an example of a screen display when the "Attack from above" option is selected;

FIG. 34 illustrates the falling block-type puzzle game of the embodiment (Part 1);

FIG. 35 illustrates the falling block-type puzzle game of the embodiment (Part 2);

BEST MODE FOR CARRYING OUT THE INVENTION

The following explanation makes reference to the figures to describe the ideal embodiment for the present invention. This embodiment applies the execution displays and new functions of the present invention to the above-described battle puzzle game. The flowcharts referred to hereafter in explaining the operations of the present invention have those segments used in the present invention either conveniently enclosed in bold lines or charted as subroutines.

Figure 1:
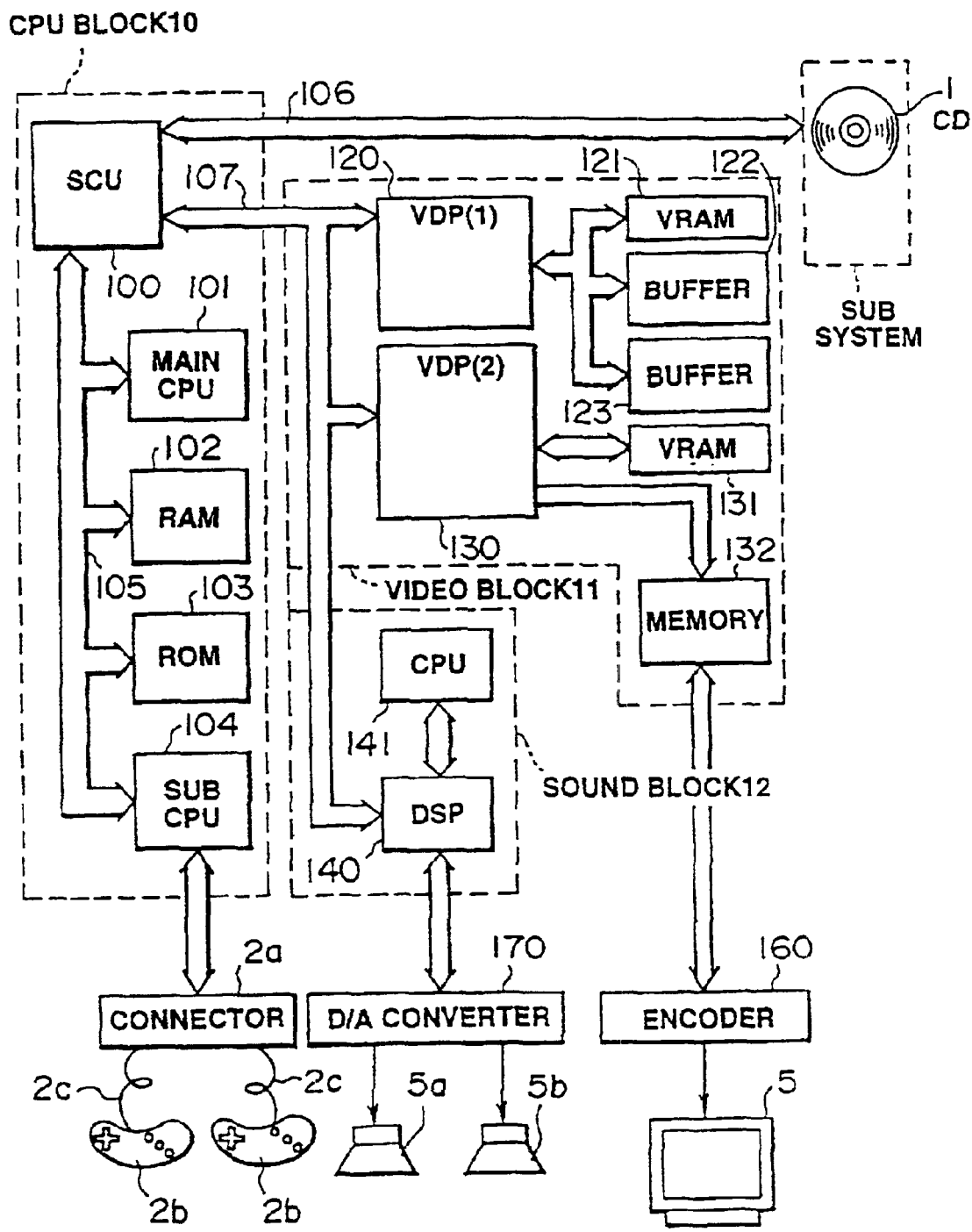
FIG. 1 depicts a block diagram of the game processing apparatus of Embodiment 1 of the present invention.

FIG. 1 depicts a block diagram of the game processing apparatus of the embodiment that utilizes the present invention. As shown in FIG. 1, this embodiment of the game processing apparatus comprises a CPU block (10), which controls the entire processor, a video block (11), which controls game screen displays, a sound block (12), which generates operative and other sounds, and a subsystem (13), which reads CD-ROM1.

(CPU Block Configuration)

The CPU block comprises a System Control Unit (SCU) (100), a main CPU (101), RAM (102), ROM (103) a sub-CPU (104) and a CPU bus (105). This block supports the main unit of the game processing apparatus of the present invention.

The main CPU (101) is equipped with an internal Digital Signal Processor (DSP) that executes processing at high speed based on program data. RAM (102) stores the program data and various image data transmitted from the subsystem (13) that reads the CD-ROM, and also serves as a work area for the main CPU (101). ROM (103) stores the initial program data for initialization, which is performed in the processor initial state. The SCU (100) manages the transmission of data over the buses (105, 106 and 107). The SCU (100) is also equipped with a built-in direct memory access (DMA) controller, and transmits to the VRAM in the video block (11) the image data required during the execution of a game.

The control pads (2b) generate operating signals based on the manipulations of the players. The sub-CPU (104) is called a System Manager & Peripheral Control (SMPC), and, in accordance with requests from the main CPU (101), collects operating signals from the control pads (2b) via the cords (2c) and connectors (2a).

(Video Block Configuration)

The video block (11) comprises a Video Display Processor (VDP) (120) for generating playing area images, and a VDP (130), which processes the movement of background images, synthesizes background images with the playing area image (hereafter referred to as "playing area"), processes hidden surfaces and performs clipping operations. The VDP (120) is connected to a VRAM (121) and two frame buffers (122 and 123).

"Playing area" refers to the playing area in which falling block-type puzzle games are actually played out based on operating signals supplied from the control pads (2*b*). The playing area is displayed in the area displayed on a monitor (5) (called the window). A plurality of playing areas are displayed. With this embodiment in particular, two- and three-playing area displays can be selected. Games are played out in each playing area based on individual operating signals. Operating signals are supplied from the player-operated control pads (2*b*), as well as from the CPU (101) itself. In other words, the game machine itself is also capable of controlling game play in the playing areas.

Just as with ordinary falling block-type puzzle games, sets of blocks generated one after the other are displayed in the playing areas, and characters assigned to each playing area are also displayed in the playing areas. When displaying playing area images, the image data required in the display are transmitted from the main CPU (101) to the VDP (120) via the SCU (100), and written to VRAM (121). The image data written to VRAM (121) are stored in one of the frame buffers used in plotting (122 or 123). The stored image data is transmitted to the VDP (130). The main CPU (101) supplies control information, which controls plotting, to the VDP (130) via the SCU (100). The background image data read in from the CD-ROM1 is also supplied to the VDP (130). This background image data comprises a logical display area (called the background area), which is larger than the window displayed on the monitor (5).

The VDP (130) is connected to VRAM (131), and determines the priorities of the playing area images and background image. In this embodiment, the playing areas are always displayed in front of the background image (in the foreground). Based on the control information supplied from the main CPU (101), the VDP (130) determines the scope of the window displayed on the monitor (5) within the wide background area. It can also move the background image up, down, right and left by altering the control information supplied from the main CPU (101). When the background image is moved, as is explained later, the players can be given the illusion that the playing areas, which are constantly displayed on the monitor (5), are moving in space. The VDP (130) outputs plotting data to an encoder (160) via memory (132). The plotting data output to the encoder (160) is displayed on the monitor (5) after being converted to a video signal format and undergoing D/A conversion processing. An image is displayed on the monitor (5) on the basis of this video signal.

(Configurations of Other Blocks)

The sound block (12) comprises a DSP (140), which synthesizes voice data using either a PCM or FM system, and a CPU (141), which controls the DSP (140). Voice data generated by the DSP (140) is converted to a two-channel signal by a D/A converter (170) and output to speakers (5*a* and 5*b*).

The subsystem (13) is equipped with a CD-ROM drive, and features functions for reading in applications software supplied by the CD-ROM1, and reproducing image data.

(Description of Operation)

Figure 3A:
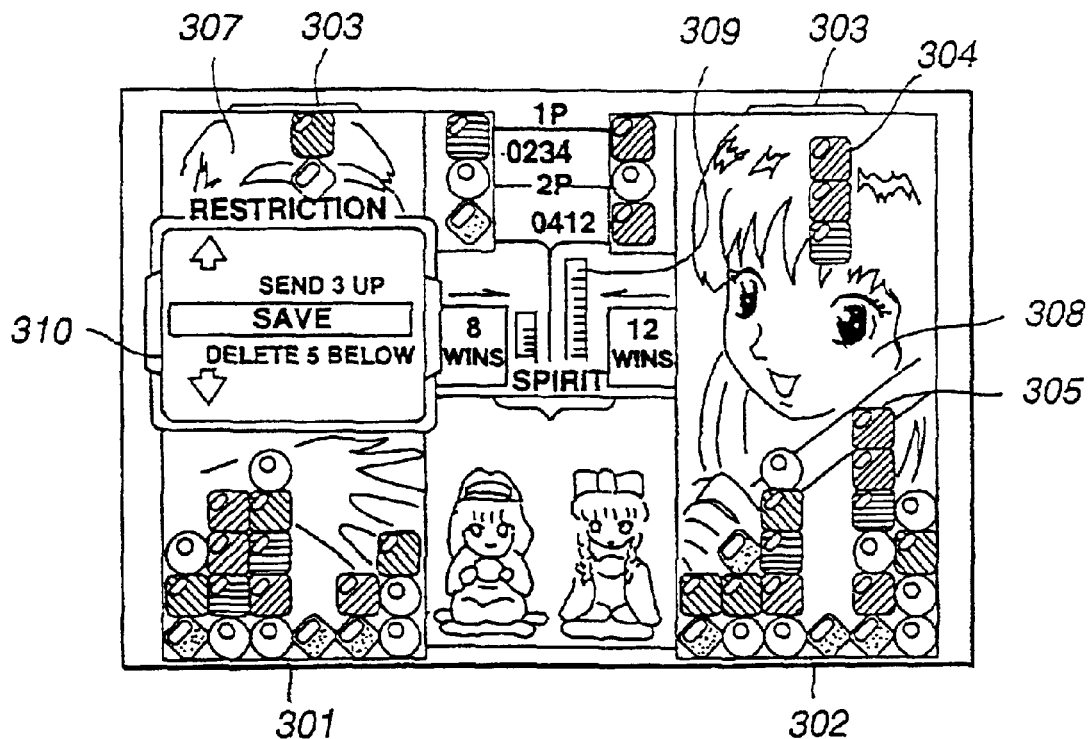
FIG. 3A–3C illustrate the screen displays of the embodiment.
Figure 3B:
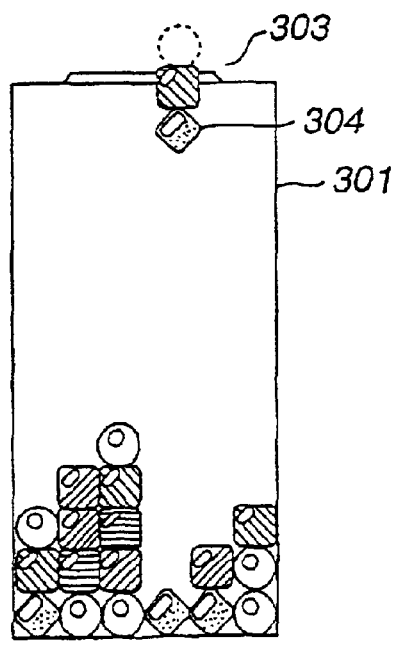

The following is a description of the operation of the embodiment of the present invention. FIG. 3A illustrates the main game screen in the falling block-type battle puzzle game of this embodiment. Two areas (301 and 302) are displayed on the screen, and an individual player operates each area (For convenience sake, areas 301 and 302 will be referred to as "playing areas" below.). Each area has a block generator (303) at the top of the area, as shown in FIG. 3B, and the blocks (304) manipulated by a player come in sets of three, and drop down from the block generator (303). If a player does not provide any input, the blocks (304) descend straight down the screen as-is in one-dot increments, and when they come in contact with the lowermost level of the playing area (301, 302), or with a pile of blocks (305) deposited below, they become fixed in that spot and can no longer be manipulated by the player (In other words, they become part of the deposited pile of blocks. Hereafter, this phenomenon is described using the expression "the blocks land and become fixed."). When the blocks (304) become fixed, a new set of blocks (304) is generated by the block generator, and begin descending once again. The blocks (304) are each painted a different color, and between four and six different colors are generally used per game.

Figure 3C:
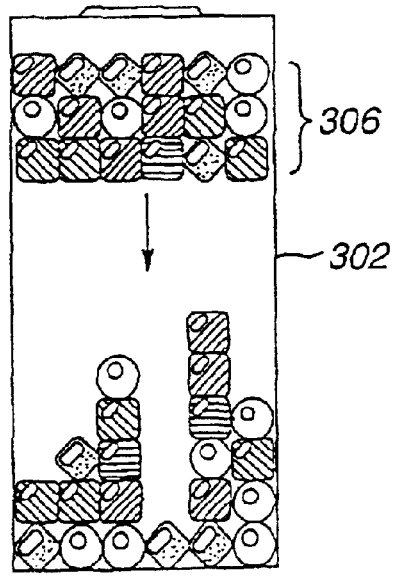

Meanwhile, the players can manipulate the blocks(304) as they descend, moving them right or left, changing the order in which the three blocks in the set are lined up, and/or rotating the three-block set 30 degrees around the center block. The players utilize the two operations described above to line up the blocks (304) and meet-predetermined conditions set by the game (Depending on the game, these conditions can be "Lining up three or more blocks of the same color vertically, horizontally or diagonally," or "Make four or more of the same color blocks adjoin one another," or "Line blocks up the entire width of the playing area."). All blocks (304) meeting these conditions are deleted, and depending on the number deleted, can enable the generation of barrier blocks (306) in the opposing playing area, as shown in FIG. 3C. A player wins by depositing blocks (304) and barrier blocks (306) until new blocks can no longer descend from his opponent's block generator (303). Also, barrier blocks (306) can either be the same as the blocks (304), or can be blocks for which the size and color settings have been changed. For instance, the blocks (304) are deleted under predetermined conditions, but the conditions by which the barrier blocks (306) are deleted can differ from the conditions under which the blocks (304) are deleted. The barrier blocks (306) can also be set so they are never deleted.

As is explained in the section on attack window processing taken up later on, here blocks can be lined up in the playing areas (301, 302) six across and 14 high.

Incidentally, the numbers 307 and 308 in FIG. 3A refer to the images of the characters selected by the players. This will be dealt with later on, but a plurality of different character images are prepared beforehand, and a player can select the character he likes from a selection screen that differs from the screen shown in FIG. 3. A specific advantage is set in accordance with the character selected, and this advantage affects play during battle.

The above explanation duplicates that for an ordinary battle puzzle configuration. As a rule, this is a game where two players battle one another, but in the standalone mode, the CPU takes charge of the opposite playing area, and the game is played in a player-versus-CPU mode.

In addition, this embodiment has a peculiar display called an attack point gauge (309). When blocks are deleted using the techniques described above, this gauge increases in line with the number of blocks deleted. This gauge is related to the timing that generates the barrier blocks in an opponent's playing area, and will be explained in more detail during descriptions of subsequent operations.

Figure 2:
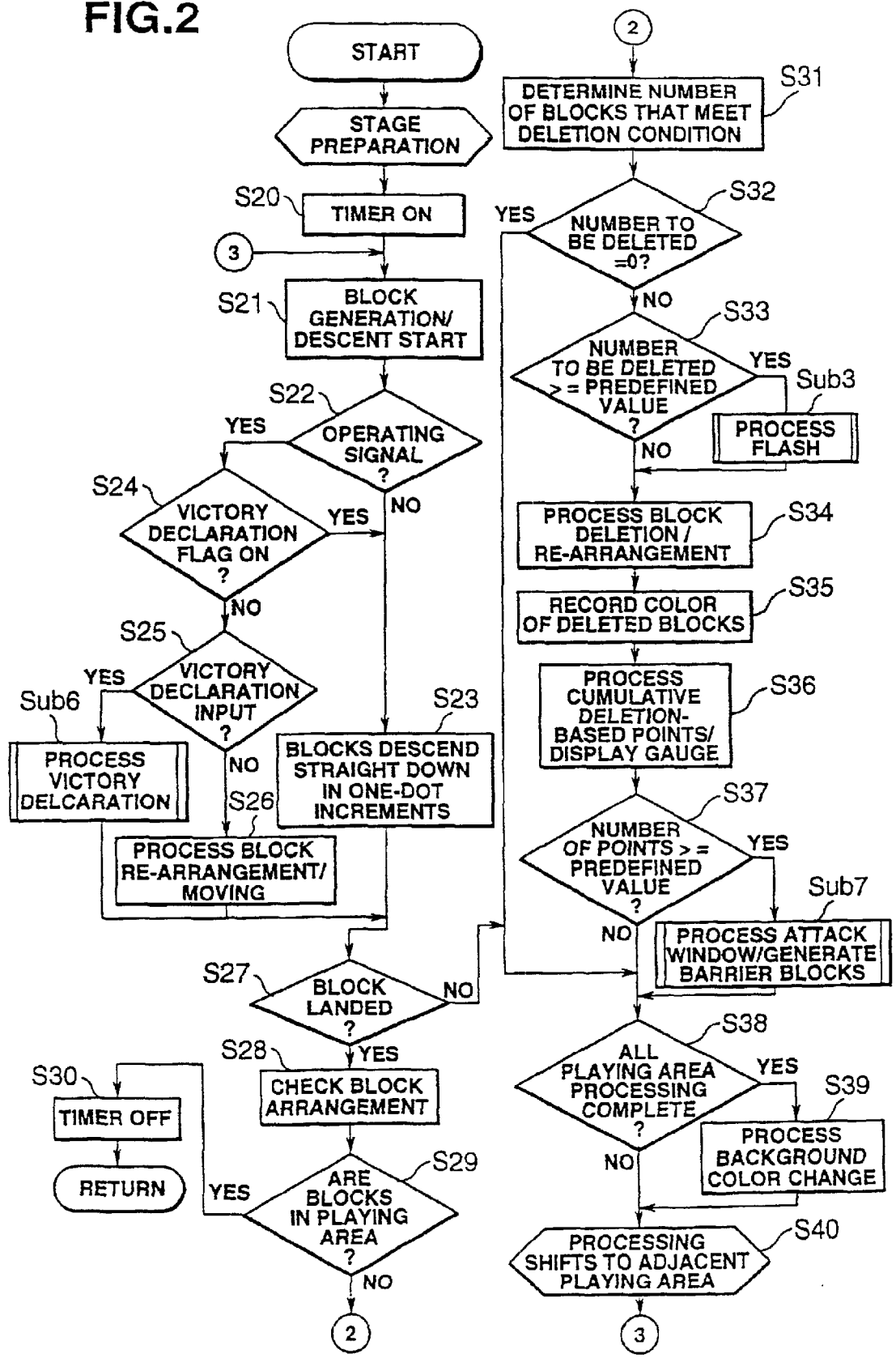
FIG. 2 depicts a flowchart explaining the overall operation of the game processing apparatus of the embodiment.

Next, the processing flow of the first battle (one match, called one stage, from the start of competition until one of the players wins) of the battle puzzle game that uses the present invention is explained using the flowchart depicted in FIG. 2. In the flowchart shown in FIG. 2, those steps from S21 on depict the processing for a single playing area. Since there are two playing areas, S21 and subsequent processes depicted in FIG. 2 are repeated twice to process the entire screen. The processing of the two playing areas is repeated alternately until the stage is completed.

Firstly, the CPU (101), after displaying the screen depicted in FIG. 3 on the monitor, initializes the software timer to measure the time it takes until a winner is determined, and commences measuring the time (S20). For reasons related to the invention, which are explained below, there are two timers, one for each playing area. Next, the blocks manipulated by the players appear at the block generators (303), and block descent processing commences (S21). The blocks descend at a rate of one screen dot each $1/60^{th}$ of a second.

When operating signals are supplied by input from the players (S22; Yes), the CPU (101) carries out processing to move and/or transpose blocks in accordance with this input (S26). At this point, instead of manipulating the blocks by carrying out predetermined operations, the players can carry out a victory declaration (S25; Yes), which is explained below. Once a victory declaration is made, the victory declaration flag turns ON (Sub6) and the flag check at S24 makes it impossible for the player to manipulate descending blocks. If a operating signal is not supplied (S22; No), the blocks descend straight down one screen dot at a time (S23).

When the blocks come in contact with the lowermost level of the playing area, or with a pile of deposited blocks (FIG. 3; 305)(S27; Yes), the arrangement of the fixed blocks inside the playing area is checked (S28). If the status at this time is such that the block generator (303) is obstructed by a block, and the blocks being manipulated cannot descend into the playing area (S29; Yes), the player whose playing area is being processed loses, and the stage ends. The time measurement that commenced at S20 stops (S30), the program returns to the overall processing of the game described below, and executes processing that queries the players whether or not they would like to play the game again.

If the blocks enter the playing area (S29; No), the CPU (101) checks all the blocks in the playing area being processed to determined how many blocks meet the predetermined conditions set by the game and are to be deleted (S31).

When no blocks are to be deleted (S32; Yes), processing in the concerned playing area is terminated and a determination is made as to whether or not processing remains to be done in the other playing area (S38). When there are blocks to be deleted (S32; No), if the number of blocks to be deleted exceeds a predefined value set by the program (for example, 30) (S33; Yes), flash processing (Sub3) is performed to warn the opposing player that barrier blocks are be to generated, following which blocks are deleted from the screen and subsequent rearrangement processing is implemented (S34). When the number of blocks to be deleted is less than the predefined value (S33; No), block deletion/rearrangement are implemented (S34) without flash processing. Block rearrangement processing as used here refers to the job of filling in the blank spaces created by deleted blocks by allowing any blocks that were above the deleted blocks to drop down into those spaces.

Next, the colors of the deleted blocks are recorded (S35). The colors recorded at this time are referred to during subsequent color change processing (S39). That is, when all playing area processing is complete, a color change process, which is one of the background display processes, is performed.

Next, the number of attack points mentioned above are calculated based on the number of deleted blocks, and after adding this number to the past cumulative number of attack points stored in a predetermined memory area of RAM, this area of RAM is written over (S36). Also, display processing for the attack point gauge (309) indicated in FIG. 3 is performed based on the cumulative attack points recorded in this RAM (S36). When the number of attack points at this time exceeds a predefined value set in the program (S37; Yes), Sub7 processing is carried out, whereby the attack selection window is displayed, and barrier blocks are generated in the opposing player's playing area in accordance with the results of that selection process. When barrier block processing is over (or, when the number of attack points at S36 was less than the predefined value), a check is made to determine whether or not processing in all playing areas has been completed (S38). When an unprocessed playing area exists (S38; No), processing switches to the opposite playing area (S40), where steps S21 through S37 are implemented. When processing is complete in all playing areas (S38; Yes), background color change processing is implemented (S39).

Figure 10:
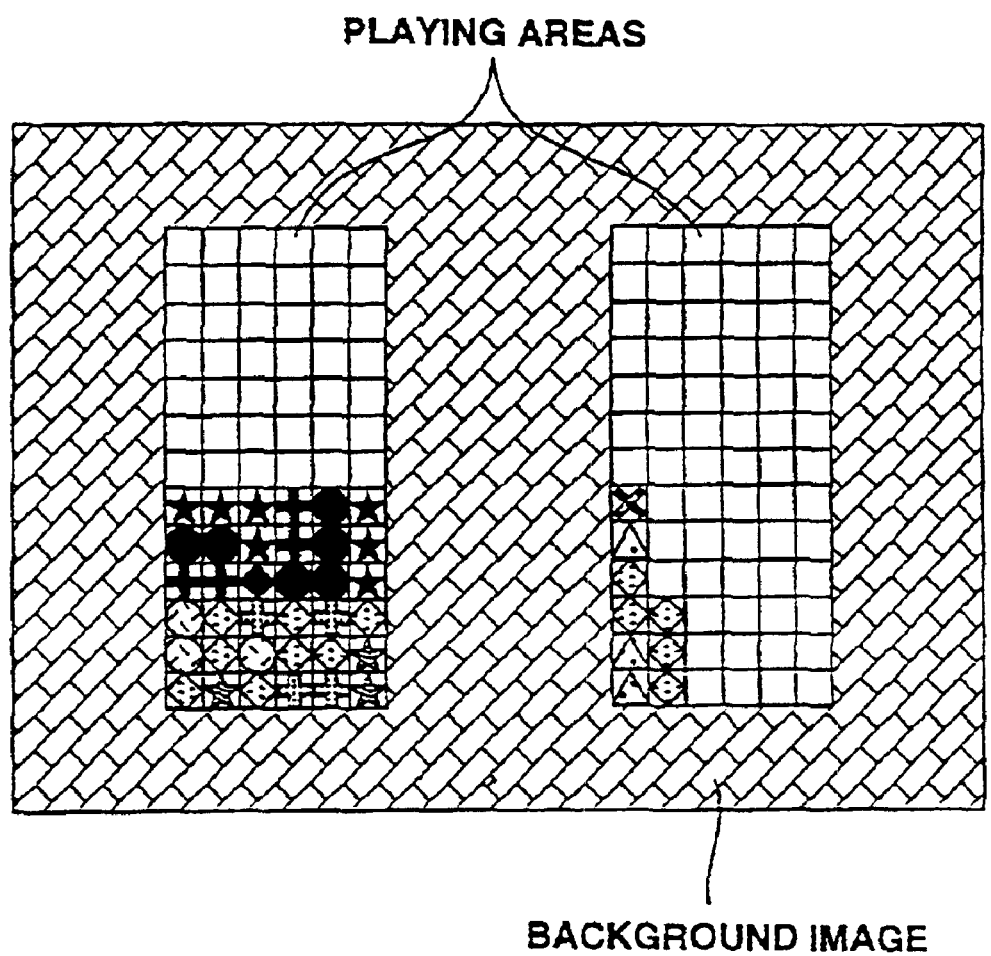
FIG. 10 depicts an example of a background image display for color change processing.

FIG. 10 depicts an example of this game's screen display. The background image displayed gives the appearance of blocks spread out behind the playing areas. Color change processing is a process whereby the colors of the deleted blocks recorded in step S35 are referenced, and the colors of these background image blocks are instantaneously changed to the colors of these deleted blocks. In addition to changing the color of the blocks, the brightness of the blocks can also be changed. Also, instead of performing processing that instantaneously changes the color of the blocks, color change processing can be performed so that the blocks change color "gradually." The above processes depicted in FIG. 2 are repeated until that stage of the game is over.

<New Function and Execution 1: Victory Declaration Processing>

The following are detailed explanations of each of the executions and new functions related to the present invention described above. The first of these is the victory declaration process described in Sub6.

Figure 4:
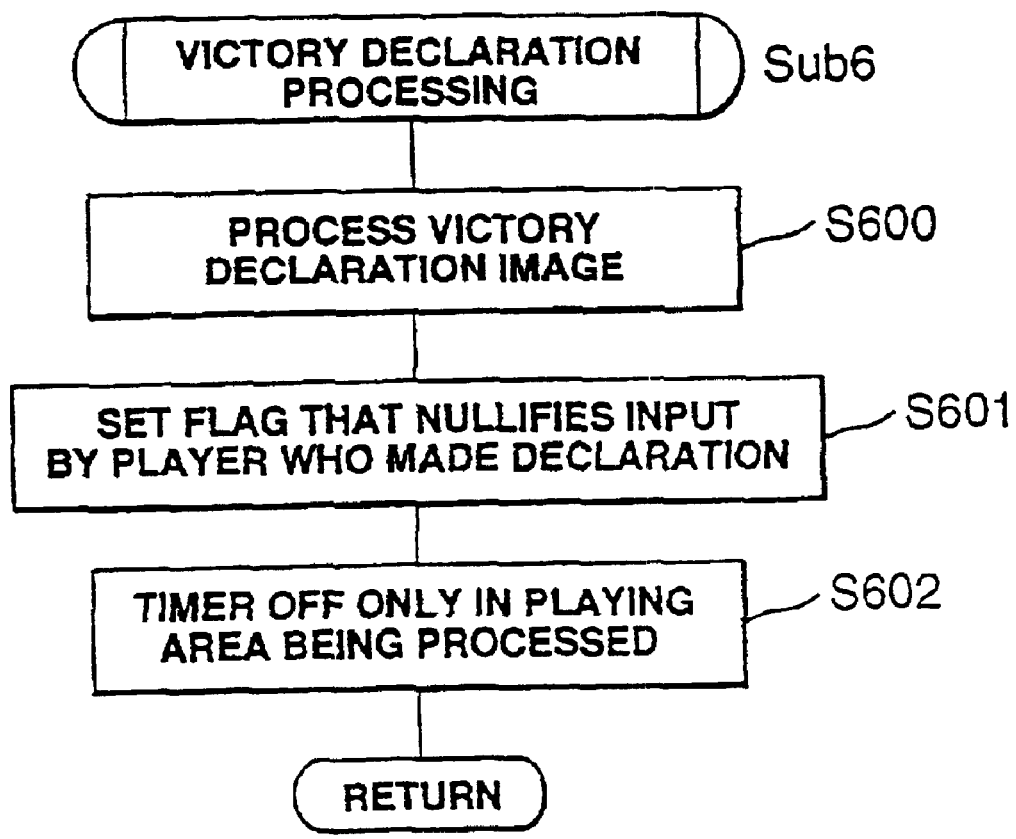
FIG. 4 depicts a flowchart that explains the processing of a victory declaration.

FIG. 4 depicts a flowchart explaining victory declaration processing. When a player makes a victory declaration (FIG. 2; S25; Yes), victory declaration image processing is performed (S600).

Figure 5:
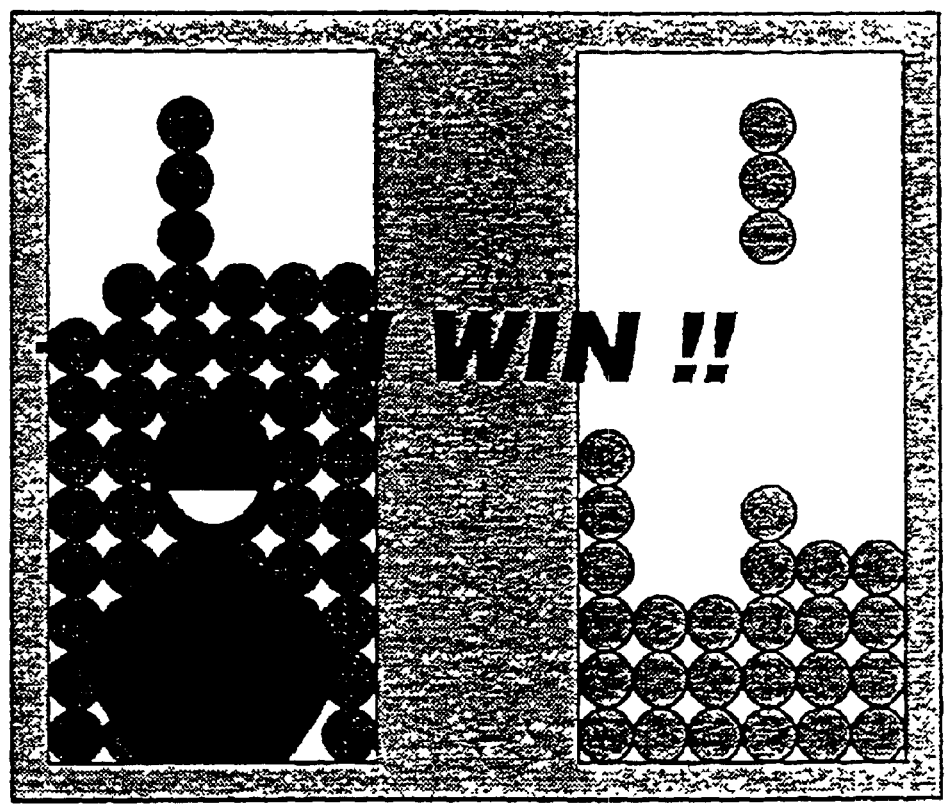
FIG. 5 depicts an example of the screen displayed for a victory declaration.

FIG. 5 depicts an example of a victory declaration image display. As can be seen from this figure, a "laughing" character intended to represent the player making the victory declaration and the words "I Win!!" are displayed across the playing area from which the victory declaration was made, as well as the other playing area. This display enables a player to inform his opponent, who is manipulating the game in the other playing area, that he has made his last move.

At the same time as the image is displayed, a flag is set for the player who made the victory declaration, nullifying any operations he makes thereafter (S601). This S601 flag is the flag used in step S24 shown in FIG. 2, and when it becomes operative, thereafter, no input whatsoever is accepted from the player until that stage of the game is over; the blocks simply descend straight down. Subsequently, the timer for measuring time for the playing area being processed (started in step S20 in FIG. 2) is stopped (S602). If the timer is not stopped here, the timer would continue to run even after the victory declaration is processed, thus making the victory declaration meaningless.

Also, as is explained below, in this embodiment, because points can be earned in proportion to the timer value for a stage (More specifically, the smaller the timer value, the higher the earned points.), when a victory is declared and the timer is shut off before the winner has been determined, rather than just waiting to see who wins, the player that declares victory can earn high points. Also, instead of the victory declaration stopping the timer, it is also possible to opt to have bonus points added directly to one's score.

<New Function and Execution 2: Flash Processing>

Figure 6:
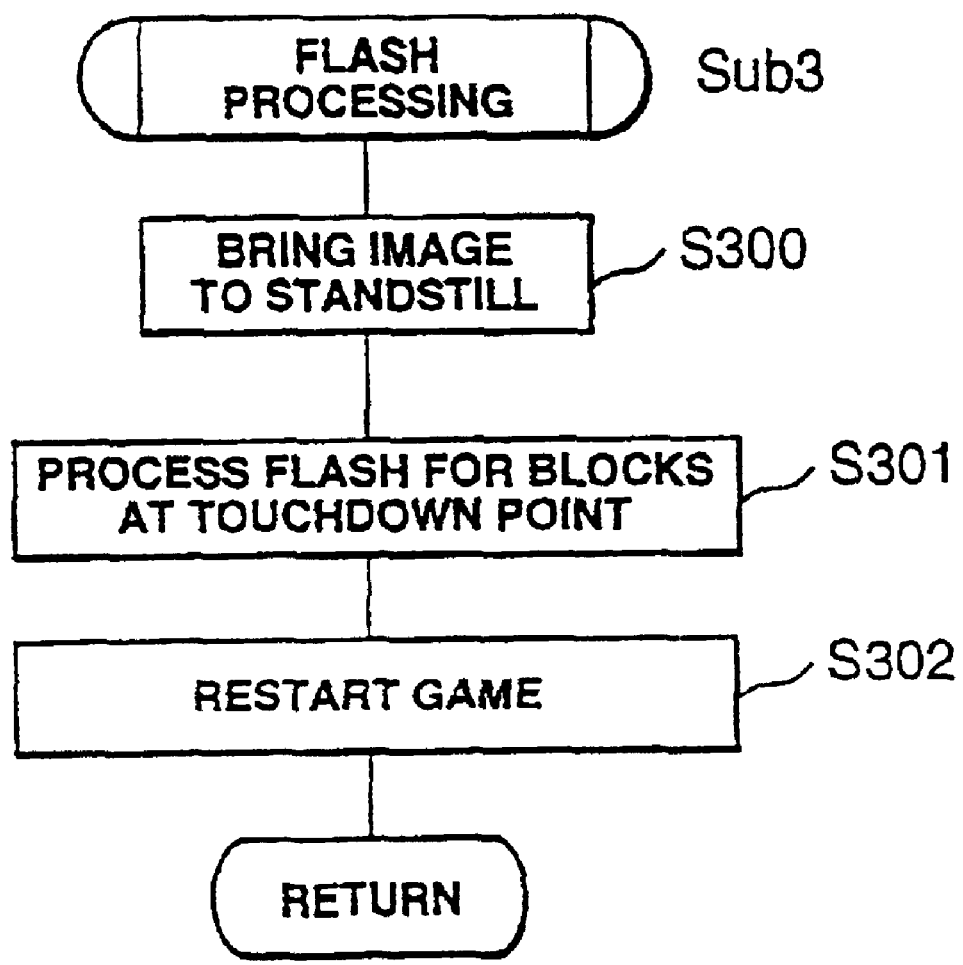
FIG. 6 depicts a flowchart that explains flash processing.
Figure 8:
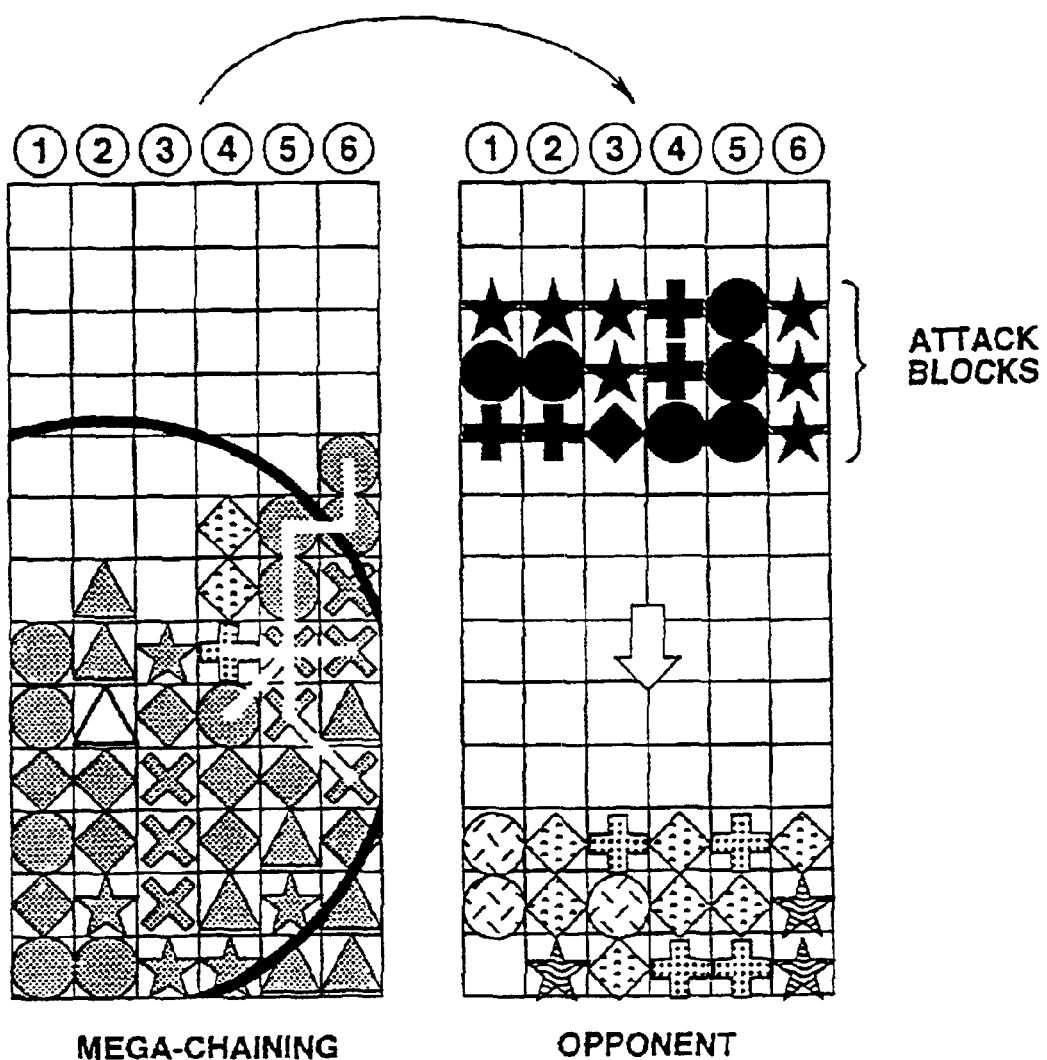
FIG. 8 depicts a diagram explaining an example of a screen display for flash processing (Part 2)

FIG. 6 depicts a flowchart explaining flash processing. When it is determined that a large chain is about to be formed (FIG. 2; S23; Yes, as shown in FIG. 7), first of all, the image in the playing area being processed comes to a standstill. That is, the descending blocks stop moving (S30). After that, as shown in FIG. 8, an image like that of a flash encircling the touchdown point of the blocks that will trigger deletion (blocks that had been descending immediately prior this) is displayed (S301). This flash display can either be based on image data prepared beforehand (what is called a sprite) or on polygon data. After a predetermined amount of time has elapsed, the game is restarted (S302), and the processing of the stage is resumed. Since play is temporarily halted, the flash display can extend beyond the playing area across the entire screen without interfering with the opposing players manipulations.

<New Function and Execution 3: Color Change Processing>

Figure 9:
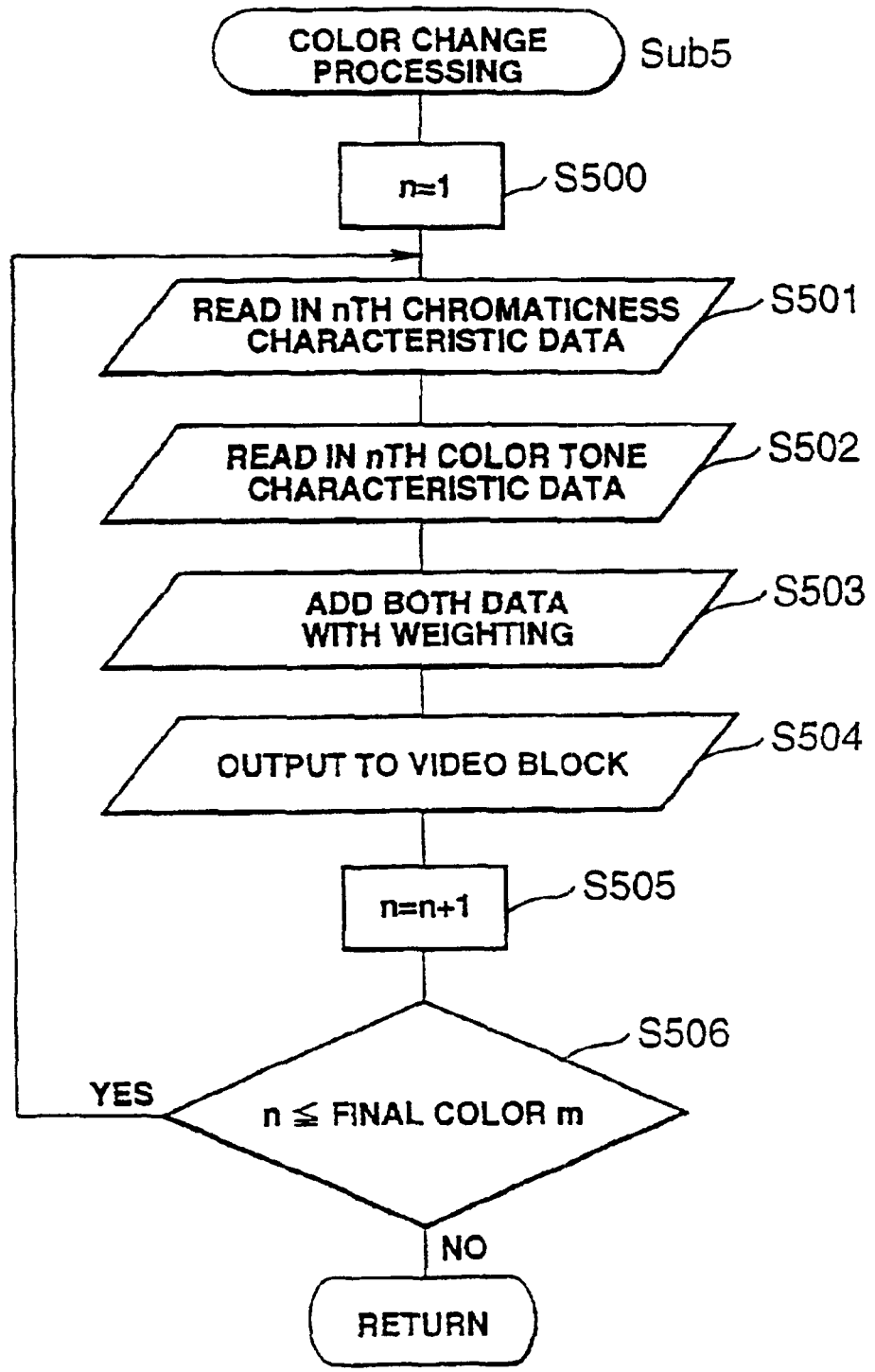
FIG. 9 depicts a flowchart explaining color change processing.

Instead of the background color change process explained using FIG. 2 (S39), performing the color change processing depicted in FIG. 9 displays the color "gradually."

This color change process (Sub5) is explained with reference to FIGS. 9 through 12. FIG. 9 depicts a flowchart explaining color change processing (Sub5). FIG. 10 is an example of the background image display displayed behind the playing areas when color change processing is implemented. The background image is completely filled in with the blocks used in the playing areas, and the color tone of that image is also assigned from the colors used in the playing areas. For example, if the blocks used in the playing areas come in six colors, the blocks comprising the background image will also feature six colors.

Color change processing (Sub5) is processed instead of step S39 described in FIG. 2. That is, when all playing area processing is complete (S38; Yes), color change is processed.

First, set the counter (n) for counting the processed colors (since processing is carried out for each color displayed in the image) to 1 (S500). Chromaticness characteristic data and color tone specific data related to the nth color can be read in from RAM (102) (S501, S502). When the nth color is not a primary color per se, then chromaticness characteristic data can be read out for the plurality of primary colors required to produce the nth color.

Figure 11:
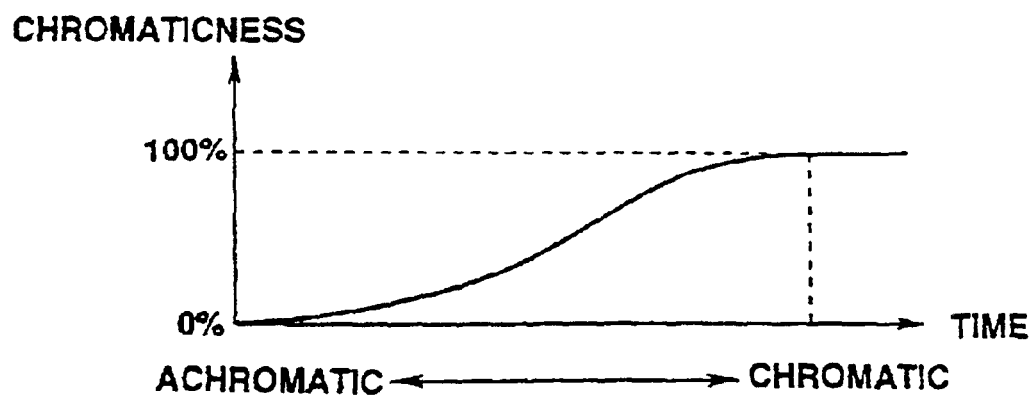
FIG. 11 depicts a diagram showing the change in chromaticness over time (chromaticness characteristic data)

FIG. 11 diagrams chromaticness characteristic data for a single primary color stored in RAM (102). This chromaticness characteristic data depicts the change in chromaticness over time from the point at which color change commenced. In the case of red, it specifies the change from an achromatic of 0% red to 100% red.

Figure 12:
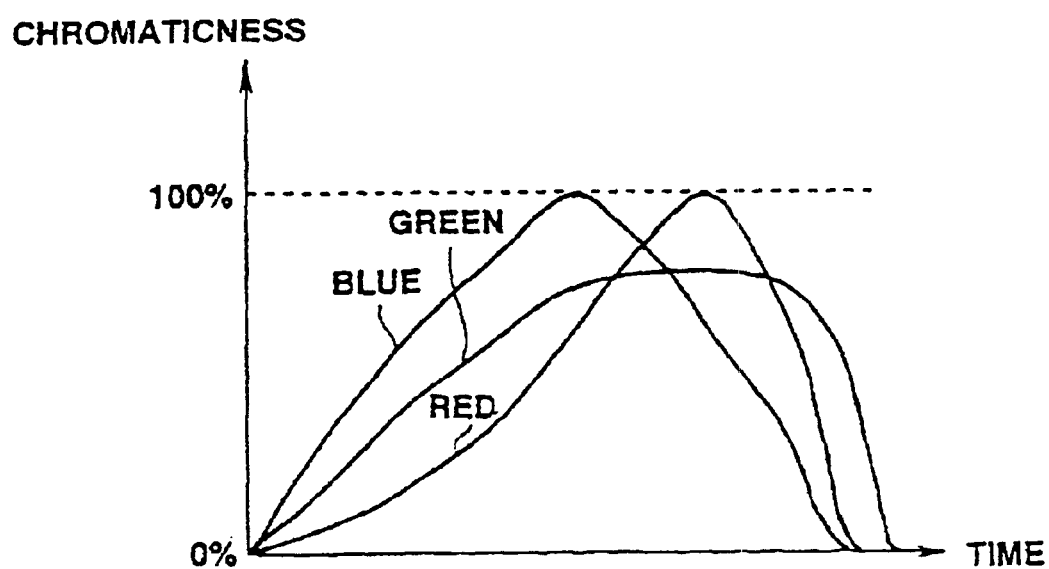
FIG. 12 depicts a diagram showing the change in chromaticness for each primary color over time (color tone specific data)

FIG. 12 diagrams color tone specific data stored in RAM (102). This color tone specific data specifies the change in chromaticness of the three primary colors from the time color change commenced. As can be seen from this figure, the change in the characteristics of each primary color are consciously made different. Also, the color tone specific data is such that the chromaticness of all the primary colors returns to 0% after a predetermined amount of time has passed.

In step S503, the nth chromaticness characteristic data and color tone specific data that was read in are added using weighting. That is, simply adding the chromaticness data gives rise to cases where the total produced by adding the ratio exhibited by the chromaticness characteristic data for a certain primary color to the chromaticness ratios of the color tone specific data for this primary color works out to over 100%. Therefore, the average (a kind of weighting) of these two data is calculated, and that average is treated as the chromaticness change characteristic for the primary color. The ratios exhibited by the color tone specific data for the other primary colors are output as-is at this time. This is performed in block units, and used to compute the chromaticness data that determines the color tone for those blocks. The computed chromaticness data is output to the video block (S504). The counter is incremented by 1 (S505), and a check is performed to determine whether or not processing has been performed up to the last color (m) (S506). When unprocessed colors remain (S506; Yes), steps S501 through S505 are repeated, and when all the colors have been processed (S506; No), return is implemented.

When the chromaticness of each color is changed in accordance with the above-described processing, the mixing ratio of the three primary colors changes together with the passage of time from the start of color change, displaying an image in which the color of the blocks changes diversely. When the chromaticness indicated by the color tone specific data after a specified period of time has elapsed becomes 0% for all three primary colors, only the chromaticness indicated by the chromaticness characteristic data is reflected in the blocks. For example, if a block has been assigned the color red, the color change commences with a dark gray, progresses through diverse color changes and finally is displayed as the primary color red. Since the background, which was achromatic up until this point, changes in a short period of time in line with the deletion of the blocks as its color tone subtly fades, the players never tire of looking at this beautiful background.

<New Function and Execution 4: Attack Selection Window Processing>

Figure 13:
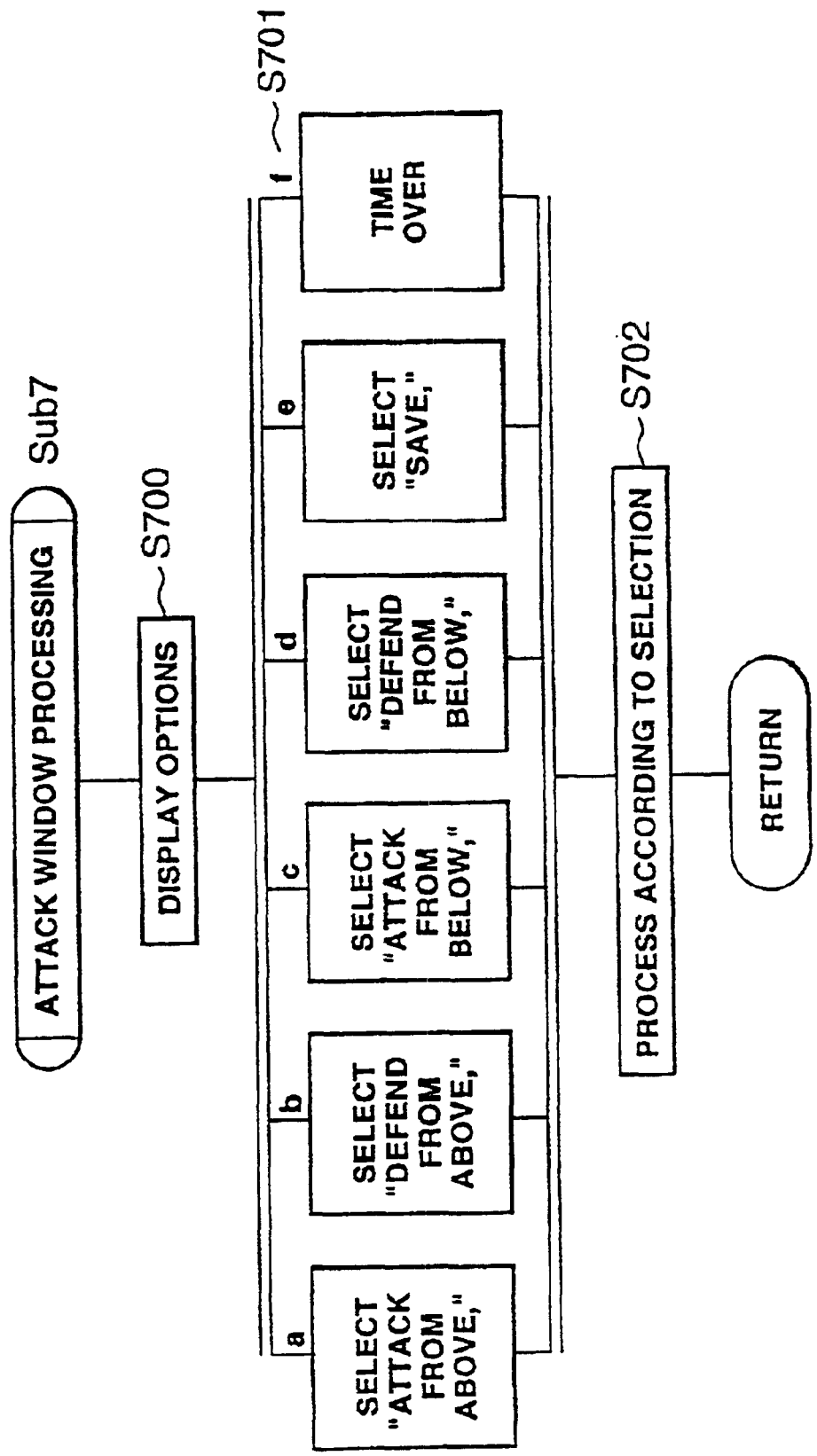
FIG. 13 depicts a flowchart explaining attack window processing.

FIG. 13 depicts a flowchart explaining the attack selection window processing and barrier block generation processing related to steps S35, S36 and Sub7 described in FIG. 2.

As explained in step S36 in FIG. 2, when the number of points earned via the deletion of blocks exceeds a predefined value, this attack window processing (Sub7) is implemented. This predefined value might be three example.

Further, the number of cumulative attack points calculated in step S35 in FIG. 2 are used in attack window processing.

TABLE 1

| indicates the number of attack points scored. | |
| --- | --- |
| No. of Blocks Deleted | Attack Points Scored |
| 3 | 20 points |
| 6 | 40 points |
| 9 | 80 points |
| 12 | 120 points |

As shown in Table 1, the larger the number of blocks that can be deleted at a time, the higher the number of attack points scored. A multiplier factor communsurate with the location of the deleted blocks within the playing area is multiplied by the number of points shown in Table 1 at this time, and the result becomes the number of points used in the attack.

Figure 14:
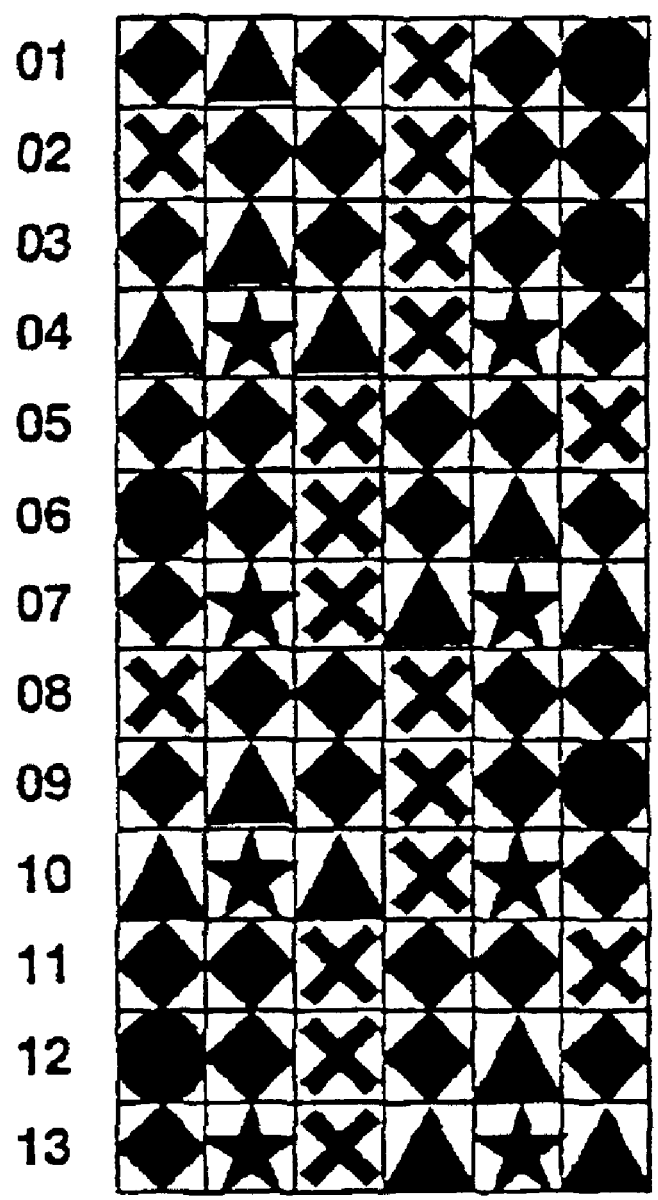
FIG. 14 illustrates a playing area whose line #'s and blocks are piled up one atop the other.

Thus, to specify locations within the playing areas, line numbers (#) are established as shown in FIG. 14. Table 2 indicates the factors related to the line numbers.

TABLE 2

| Line # Where Blocks Deleted | Point Number Factors |
| --- | --- |
| 01-04 | 3x |
| 05-08 | 2x |
| 09-13 | 1x |

According to Table 2, the lower the line #, that is, the closer the block is located toward the top of FIG. 14, the higher the factor assigned to it. This is because the blocks pile up, and when manipulating blocks located in the lower line numbers, there is less time allotted for manipulation, making manipulation more difficult. Further, players manipulating blocks in these locations of their playing areas, generally feel they are in a pinch. The thinking was that if high factors were set for these locations, since high scores could be earned by deleting just a few lines, players who are at a disadvantage could suddenly come from behind, increasing the enjoyment of game play.

Also, the number of points and factors assigned to each line can be set arbitrarily without referring to the above tables.

Step S700: When step S36 in FIG. 2 is judged to be Yes, a list of options are displayed. Options refer to processes that the players can select. While a list of options is being displayed, the progress of the game is halted. The options referred to here are displayed in 310 of FIG. 3.

FIGS. 15 through 20 depict examples of option list displays. A player can select a process from among a plurality of options by operating the cross-shaped cursor key on the control pad (2b) that he operates himself. An optional process selected by a player is implemented by the game processing apparatus.

For example, "Attack from above," refers to processing whereby blocks are dropped into the opposing player's playing area from "above." The process of dropping these blocks refers to processing by which, if the playing area (302) shown in FIG. 3c, for example, were the opposing player's playing area, the attack blocks (306) in the upper portion of the playing area (302) would drop down. Similarly, "Attack from below" refers to processing whereby the number of blocks is increased so as to push the blocks in the opposing players playing area upward from "below." "Defend from above" refers to processing whereby several levels of deposited blocks are deleted from above in a player's own playing area. Similarly, "Defend from below" refers to processing whereby several levels of deposited blocks are deleted from below in a player's own playing area.

Further, "Save" refers to processing whereby the number of points just scored are accumulated without immediately selecting a process. That is, points can be accumulated and used the next time. Incidentally, a process can be added so that when a player selects "Save," if the points accumulated at that time reach the upper limit value set for the game (that is, when the point gauge (309) shown in FIG. 3 is full), a penalty is assessed, his points are canceled, and his score returns to 0. The options indicated in 310 of FIG. 3 provide an example of a player selecting "Save."

Also, the list of options depicted in FIGS. 15 through 20 can either be displayed in the order shown, or can be displayed in an arbitrary order.

FIG. 21 depicts an example of a list of options displayed on the screen. In a playing area where the number of points have reached a fixed value (The playing area shown on the left side of the figure), the list of options is displayed in a menu bar format like this.

Step S701: A player looks at each of the options, and selects the process he likes by operating the cross-shaped cursor key on the control pad (2b).

The Time Over depicted in Step S701 (f) refers to the automatic execution of the process selected on the menu bar when a fixed period of time (10 seconds, for example) has elapsed without the player selecting an option. This process is necessary to keep the game moving along at a quick pace. A configuration can be used whereby several points (3 points, for example) are added to a players score when Time Over occurs.

Step S702: The process selected in step S701 is executed. For example, in FIG. 21, if the player selects "Attack from above," processing is implemented whereby blocks are dropped into the opposing players playing area (The playing area depicted on the rights side of the figure) from above as shown in FIG. 22.

Also, when "Save" is selected in step S701, the number of points at this time are stored up. The next time blocks are deleted and options are displayed, these stored points are added to (stored with) the points scored at that time. The intensity of the displayed attack and defense varies according to the number of stored points. Table 3 lists the attack and defense levels set in accordance with the number of stored points.

TABLE 3

| Stored Points | Level |
| --- | --- |
| 0 | Options not displayed |
| 01-15 | Level 1 |
| 16-29 | Level 2 |
| 30 or more | Level 3 |

The higher the level, the stronger the intensity of attacks and defenses (The strength of the intensity is reflected somewhat in the number of blocks sent to an opponent's playing area, and the number of blocks a player is capable of deleting from his own playing area.).

Table 4 lists how many blocks are allotted for an attack, and how many blocks are deleted in a defensive operation for each option selected in the levels described in Table 3 above.

TABLE 4

| Level | Attack from Above | Attack from Below | Defend from Above | Defend from Below |
| --- | --- | --- | --- | --- |
| Level 1 | 1 line | 2 lines | 2 lines | 3 lines |
| Level 2 | 2 lines | 4 lines | 4 lines | 6 lines |
| Level 3 | 3 lines | 6 lines | 6 lines | 9 lines |

This table indicates the number of lines of blocks that can be sent to an opponent's playing area when "Attack from Above" and "Attack from Below" are selected, and the number of lines of blocks that can be deleted from a player's own playing area when "Defend from Above" and "Defend from Below" are selected.

That is, the more points a player has, the more blocks he can send to his opponent's playing area by selecting "Attack," and the more points he has, the more blocks he can delete from his own playing area by selecting "Defend."

Also, the level relative to number of points, and the number of blocks for attacking or deletion relative to each level can be set arbitrarily without regard for the above tables.

Further, processing can be implemented so that not only the power of the attack changes in accordance with the number of points, as described above, but also the options displayed in the window change.

As a variation of this embodiment, the game processing apparatus can also be configured so that when there are 5 or more points in step S36 in FIG. 2, a player can display the option list, and attack or defend any time regardless of whether or not blocks are deleted.

It is desirable for the game processing apparatus to be configured so that the option list can be displayed by operating a prescribed button on the control pad (2b). If the number of points exceeds a fixed value when this button is operated, the game processing apparatus displays the option list regardless of whether or not blocks are deleted. This enables the players to determine if the time is right for an attack or if defense is warranted, and to operate the control pad (2b) button, display the option list and select attack or defend at their discretion.

As described above, since the game processing apparatus is configured so that the option list is displayed in accordance with this attack window processing, it is possible to add a new element of play to the game, by which the players are allowed to select the contents of attack and defend operations. Further, since, by selecting the "Save" option, it is possible to store up points until reaching a high level, and to carry out an attack at a strong level thereafter, both players feel the tension generated by the fact that the flow of play can suddenly be reversed.

<Overall Operation of the Game>

Figure 23:
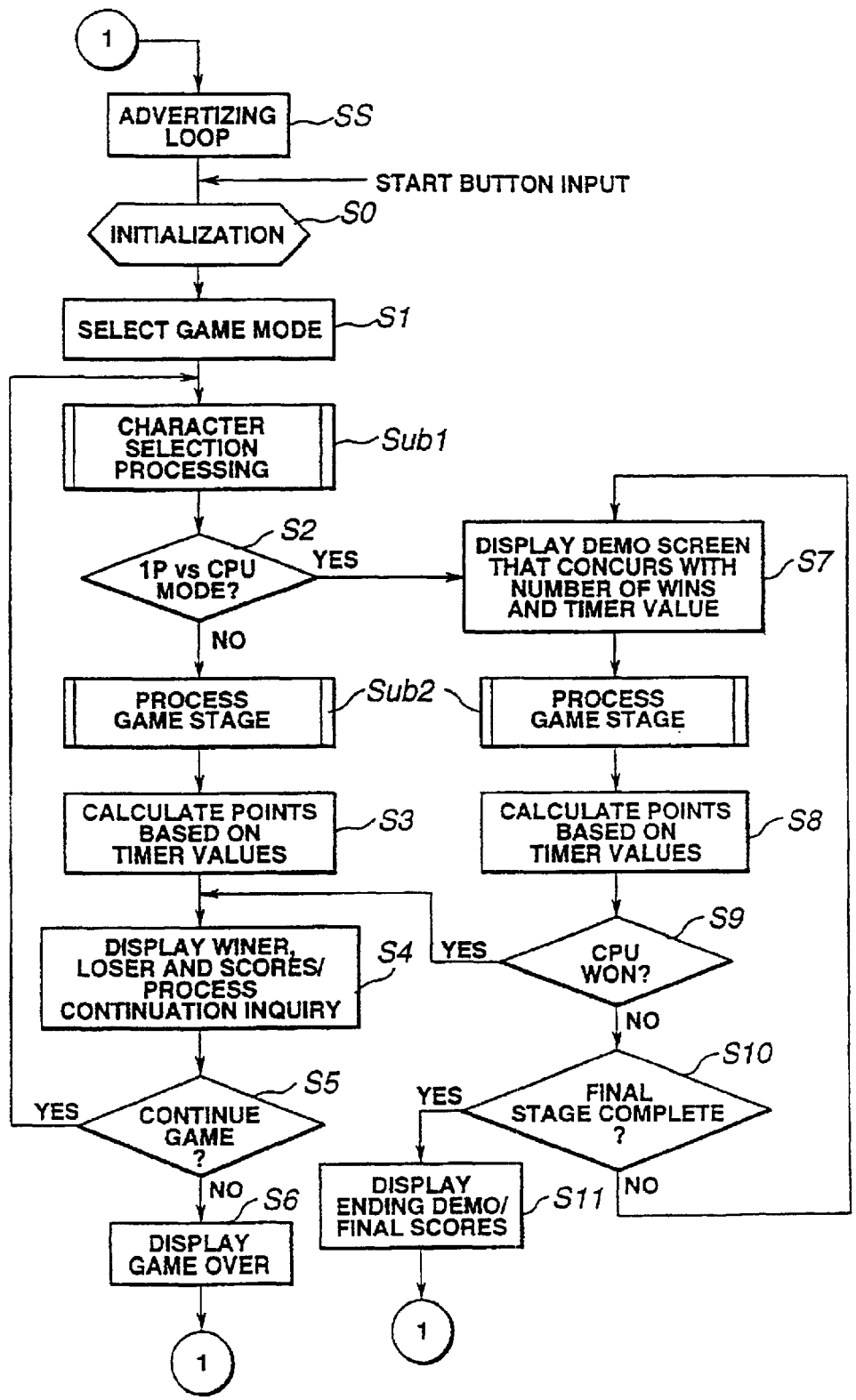
FIG. 23 depicts a flowchart explaining the processing of game stages.

The actual contents of a game have been described thusfar, but the following uses FIG. 23 to explain the overall flow of a game that applies other new functions of the present invention.

Prerequisite processing in FIG. 23 consists of completing the initialization of each device, and transmitting the game program data of a battle puzzle game from the subsystem (13) to RAM (102).

Before the players commence playing the game, the CPU (101) repeatedly processes an advertising loop (SS). That is, the sponsor's logo, the title of the game, an explanation of the rules of the game and even a brief demonstration of how the game is actually played are repeatedly displayed. When the players specify the start of the game by inputting the start button, the processing of the advertising loop is canceled and processing switches to the main part of the game.

In processing the main part of the game, the game mode is determined by the coin(s) inserted and the specifications of the players (S1). One of two modes can be selected here, either the 1P vs CPU mode (1P signifies one player), whereby the battle is fought between the playing area manipulated by the above-described player and the playing area controlled by the CPU (101), or the 1P vs 2P mode, whereby two players battle each other.

Next, processing moves to the selection of the characters to be used by the players (Sub1), and the players select the character images they like from the character selection screen (FIG. 27), which is described below in the explanation of the model selection process (When there is only one player, the CPU selects the character for the opposing playing area.).

Also, with this embodiment, as is explained in FIG. 23, the character selection process (Sub1) is performed at the start of a game, and when the game is continued, but character selection can also be done at each stage of the game.

Once character selection is complete, a demonstration screen is displayed (S7) in the 1P vs CPU mode only (S2; Yes), and processing of the game stage explained up to the section prior to this commences.

Once the battle has been decided, and the program returns from game stage processing, in the 1P vs CPU mode, the scores are calculated (S8) and it is determined whether the player won or lost the game (S9). When the player loses (S9; Yes), the results of the game and the scores are displayed (S4), and a query is displayed inquiring as to whether or not the game is to be continued (S5) (Continue, in this case, means the player challenges the CPU to a re-match.). When the game is not continued at this point (S5; No), Game Over is displayed, thus indicating the game has been completed, and the program returns to the advertising loop (S6→(1)). When the player wins the game (S9; No), the elapsed time is determined by referring to the timer value, the scores for that stage of the game are tallied in accordance with the elapsed time, the scores are recorded in RAM, and if it is not the final stage (S10; No), an intermediate demonstration (demo), which is displayed during the interval prior to the next stage, is determined (S7). What is referred to as the intermediate demonstration (demo) here is an image displayed during the interlude between game stages, and this displayed image normally has the characteristics of a story of some sort. In general, each stage of the game is equipped with three or more intermediate demos, and it is normal for a different intermediate demo to be displayed during each interlude, plus there are also cases where the characters displayed in each of the stages of the game are designed to conform to the image and story used in the above-described intermediate demos. At times, each of the intermediate demos comprises a part of a larger story, and when a player wins his way to the final stage of the game, there are also instances where an execution is implemented in which one long story is brought to a close.

Figure 24:
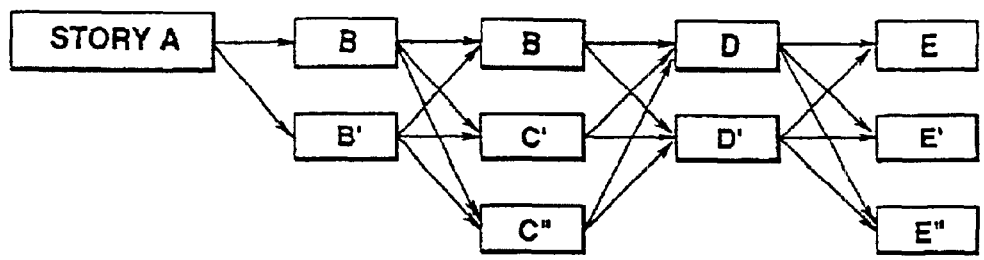
FIG. 24 illustrates how the game story evolved in the past.
Figure 25:
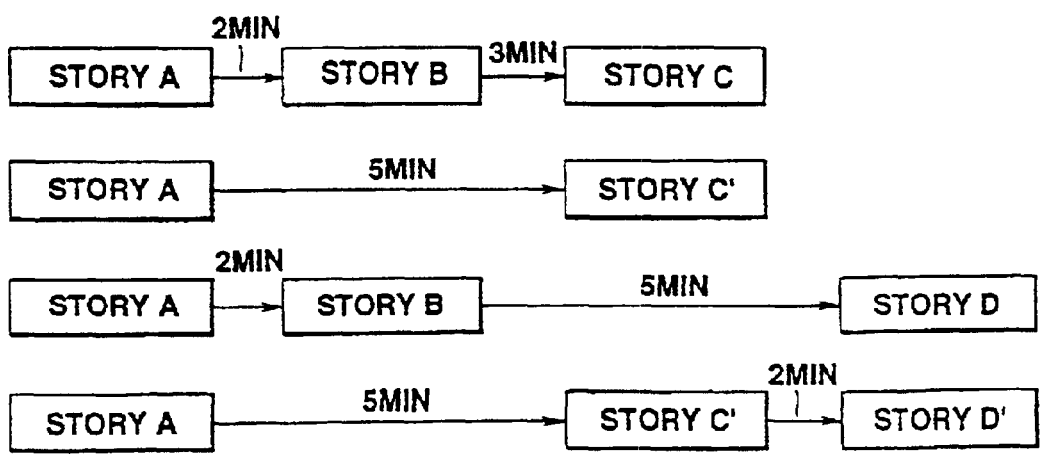
FIG. 25 illustrates how the present invention evolves the game story.

As depicted in FIG. 24, there have also been games in the past which made possible the unfolding of a plurality of stories by combining each of the intermediate demos. With this approach, when one game stage is complete, the follow-up game story was selected in accordance with the contents of the operations performed by the player in the story. By contrast, the display-enabled game stories in this embodiment change at specified intervals. Therefore, the stories that can be viewed change in accordance with how long it takes to process a stage of the game (that is, the player level). The game story progresses together with the passage of time, regardless of how the player plays the game.

Then, when the processed game stage is not the predetermined final stage (S10; No), play moves to the next stage of the game (Sub2). When the final stage is won, the total number of points are calculated from the points scored (subtotals) and stored in RAM during each stage of the game, the final scores are displayed, and the final demo screen, which brings the story to a close, is displayed (S11). When this is complete, the program returns to the advertising loop (SS).

Further, when a game is played in the two-player mode (1P vs 2P) (S2; No), after the match has been determined via the processing of the game stage (Sub2) and processing returns to the main program, the scores are calculated and displayed in the same way as in the one-player mode (S4), and the continuation inquiry is processed as-is (S5). The demo screen is not displayed. Also, the continuation inquiry is implemented at each stage of the game here, but a best-of-three mode, whereby the first player to win two stages is the victor, is also possible. In this case, the counter can be set in advance to count the number of stages won by each player, and a branch operation can be programmed so that the program returns to game stage processing without executing continuation inquiries after matches have been decided until one of the players wins two stages.

<New Function and Execution 5: Character Selection Processing (Sub1) (Bonus for Continuous Selection of Same Character)>

This invention relates to improvements made to the execution when selecting the characters described above.

Figure 26:
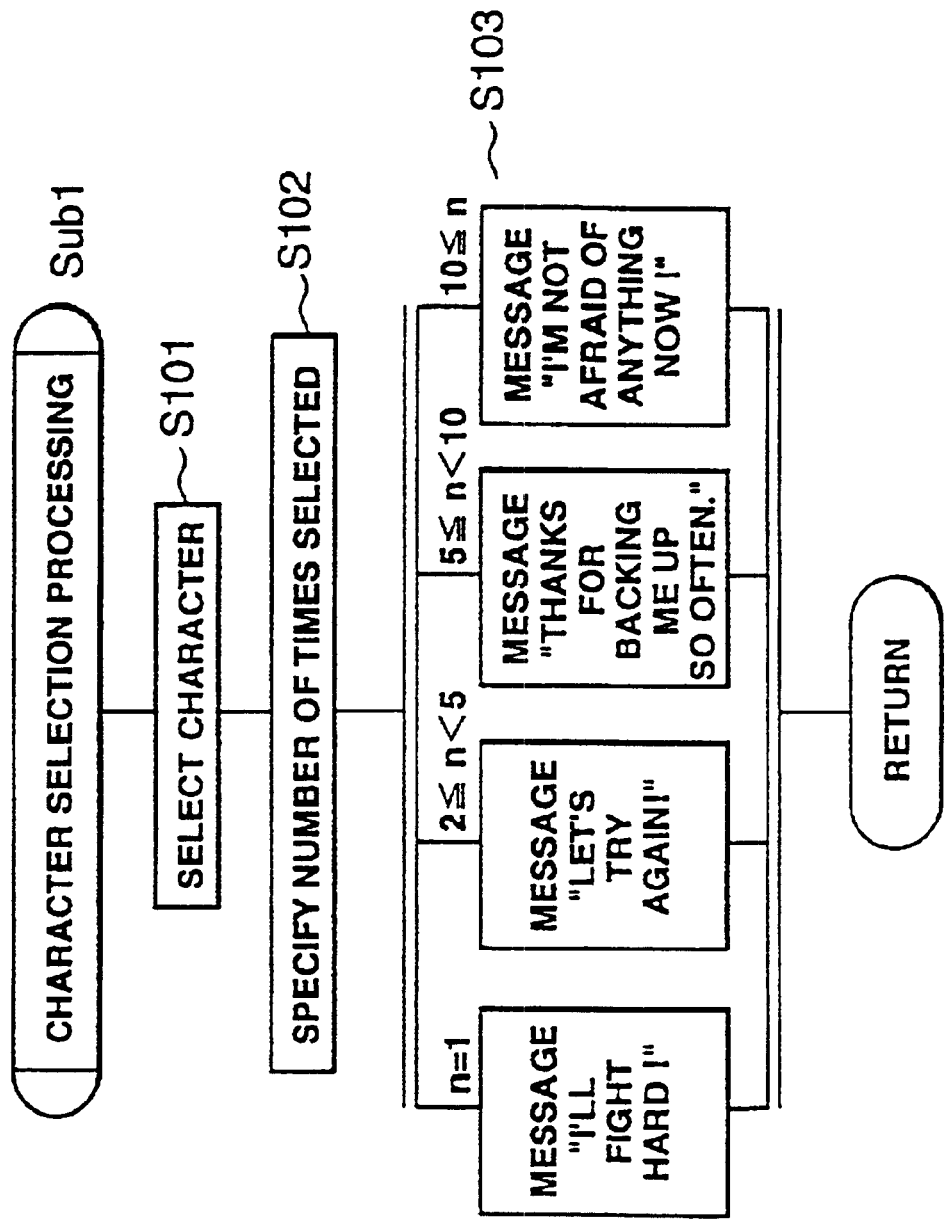
FIG. 26 depicts a flowchart explaining the character selection process.

FIG. 26 depicts a flowchart explaining character selection processing (Sub1). This processing is normally only performed at the start of a game, but with this embodiment, as indicated in the flowchart depicted in FIG. 23, it is carried out at the start of a game and when continue is selected (FIG. 23, S5; Yes).

Step S101: When this process is specified, a character is selected. A plurality of types of characters are available. As was explained with reference to FIG. 3, one character is allotted to each playing area. These characters do not serve merely as the background for the playing areas; the characters characterize game play. That is, depending on the character, the degree of difficulty might change, or the order in which blocks appear might differ. Further, each character is provided with different messages, and the contents of these messages are displayed in balloons, or the messages can be issued as voiced sounds via widely-used voice synthesis technology.

Figure 27:
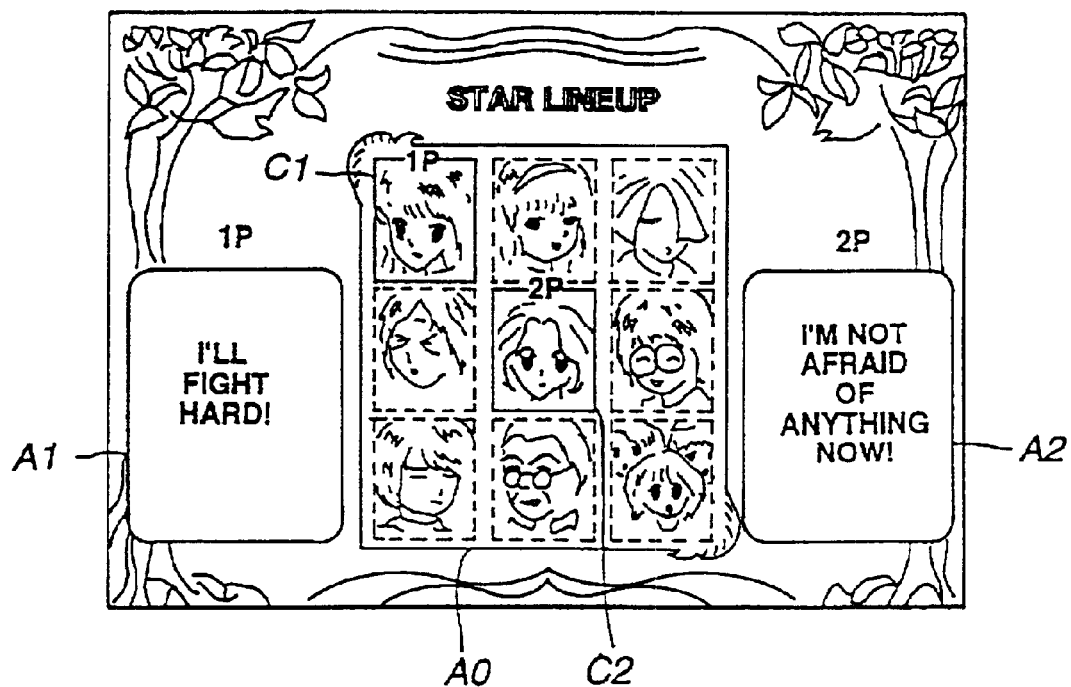
FIG. 27 illustrates a screen display of the characters and their messages.

FIG. 27 depicts an example of a character selection screen display. Area A0 is a menu on which the characters capable of being selected can be viewed. The player operates the cross-shaped cursor key on the control pad (2b). A character tentatively selected from area A0 in accordance with this cursor key operation can be selected. In FIG. 27, tentatively selected characters are indicated by solid lines, and non-selected characters are indicated by broken lines. Character C1 has been tentatively selected by player 1P, and character C2 has been tentatively selected by player 2P. Once a player has tentatively selected the character he wishes to use, he stops operating the cross-shaped cursor key, and presses the selection button on the control pad (2b). This selects the tentatively-selected character as the character for the next game stage. The CPU (101) stores in RAM (102) whichever characters are selected for whichever game stage.

Step S102: Selection frequency is specified. The CPU (101) refers to the character selection history stored in RAM (102) and specifies the number of times the same character as that character selected in step S101 has been selected in the game stages processed from the start of the game until the present. This selection frequency is labeled n.

Step S103: Determines the message to be displayed in accordance with the number of times the character has been selected. For example, when a character is first selected (n=1), "I'll fight hard!" is displayed. When that same character is selected two or more times but less than five times ($2 \leq n < 5$), "Let's try again!" is displayed. When the same character is selected more than five times but less than 10 times ($5 \leq n < 10$), "Thanks for backing me up so often." is displayed. And when the same character is selected 10 or more times ($10 \leq n$), "I'm not afraid of anything now!" is displayed. In other words, the frequency with which a character is selected is assumed to indicate the degree of confidence placed in that character, and the contents of the messages either displayed or voiced are designed to respond to that sense of trust. Also, the contents of the messages and the selection frequency ranges can be changed as deemed expedient.

As shown in FIG. 27, when a character is selected, its message is displayed in message column A1 or A2. The contents of this message will change depending on how many times the character has been selected. In this figure, since player 1P and player 2P have selected the same characters with different frequency, different messages are displayed in the respective character's message columns.

Once the messages have been displayed, processing moves to the next game stage.

Also, with this embodiment, the contents of the messages change in line with the selection frequency, but the appearance of the characters can be changed instead of changing the messages. For example, as selection frequency increases, a character's expression might become happier, or a character's clothing might change.

Further, the degree of difficulty of the game can also be changed in line with character selection frequency. For example, as selection frequency increases, the degree of difficulty of the game might be reduced.

Further, the time limit allotted to a game stage might also be changed in line with character selection frequency. For example, as selection frequency increases, time limits might be lengthened.

Further, the character messages and appearance, the degree of difficulty of the game and time limits can be changed in accordance with whether the same character is continuously selected, or whether a different character is selected part way through a game. For example, if a different character is selected part way through a game, a message like "You traitor!" could be displayed, or the character's expression could show anger.

Further, with this embodiment, the character is selected to be displayed as the background image for a puzzle game, but when the game is a so-called fighting game, instead of a character being displayed in the background, the player selects from the character selection screen the character which he will manipulate directly.

<Applications/Variations>

By applying the above-described functions, the following embodiments are also possible.

(Chain Count-based Execution)

The occurrence of flash processing and color change processing as depicted in FIG. 2 was determined by the number of blocks that were deleted, but counting the number of "chains" could be used instead. Chaining is when a pile of deposited blocks, like those shown in FIG. 34, meets a prescribed condition, for example, when blocks of the same shape line up three in a row vertically, horizontally or diagonally, that line of blocks disappears. The blocks that were piled up on top of the deleted blocks drop down. As shown in FIG. 35, when the set of blocks marked A drops down column 3, three circular blocks are lined up vertically, causing those circular blocks to disappear. The phenomenon whereby blocks disappear, get re-arranged, and result in yet other blocks disappearing one after the other like this is called "chaining." The number of these chains could be determined by step S33 depicted in FIG. 2, and could be used in such a way that, for example, when four or more chains occurred, flash processing would be implemented (Sub3).

Figure 36:
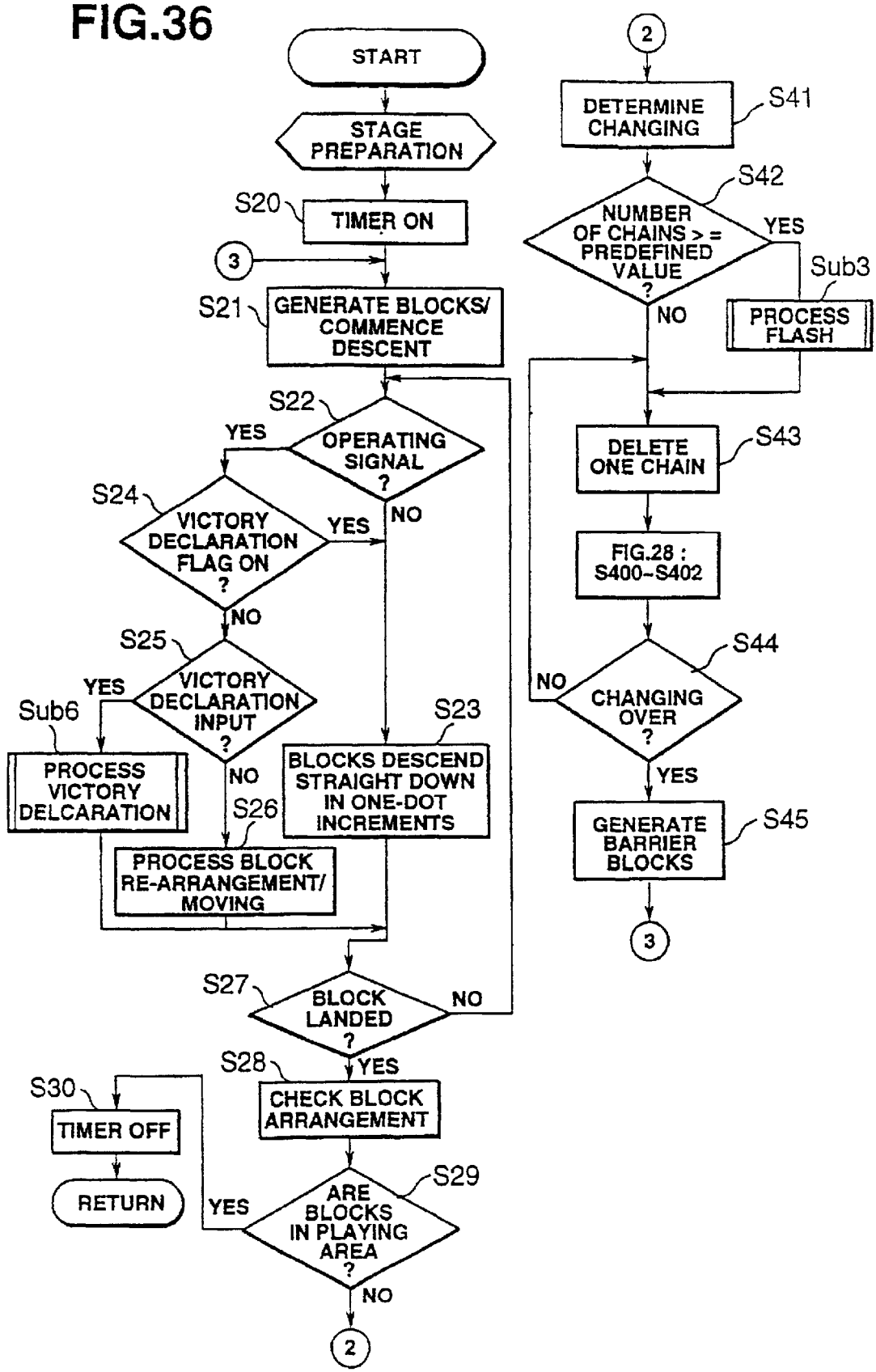
FIG. 36 depicts a flowchart explaining color change processing when chaining occurs.

Also, when execution is based on this chain count, because it is desirable that the color of the background blocks changes each time a line of blocks is deleted during chaining, background color change processing, explained in relation to step S39 in FIG. 2, is executed in accordance with the flowchart depicted in FIG. 36.

Figure 37:
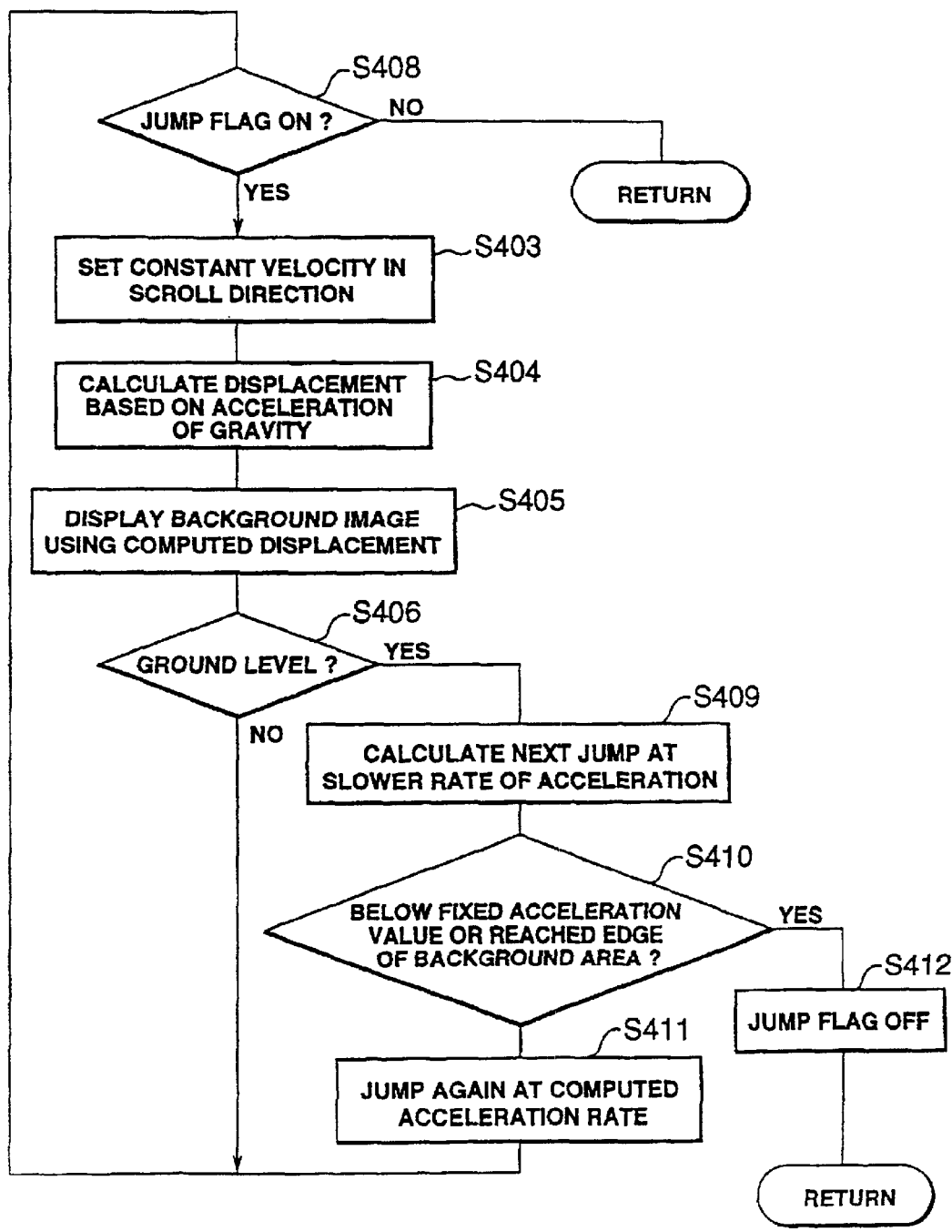
FIG. 37 depicts a flowchart explaining background jump processing when the processing charted in FIG. 36 is implemented.

Further, when processing is implemented on the basis of the above-described flowchart depicted in FIG. 36, the flowchart for background jump processing explained next is as shown in FIG. 37.

(Background Jump Processing)

The background jump processing described below can also be used as background image processing like the color change processing (S39) described with reference to FIG. 2.

Figure 28:
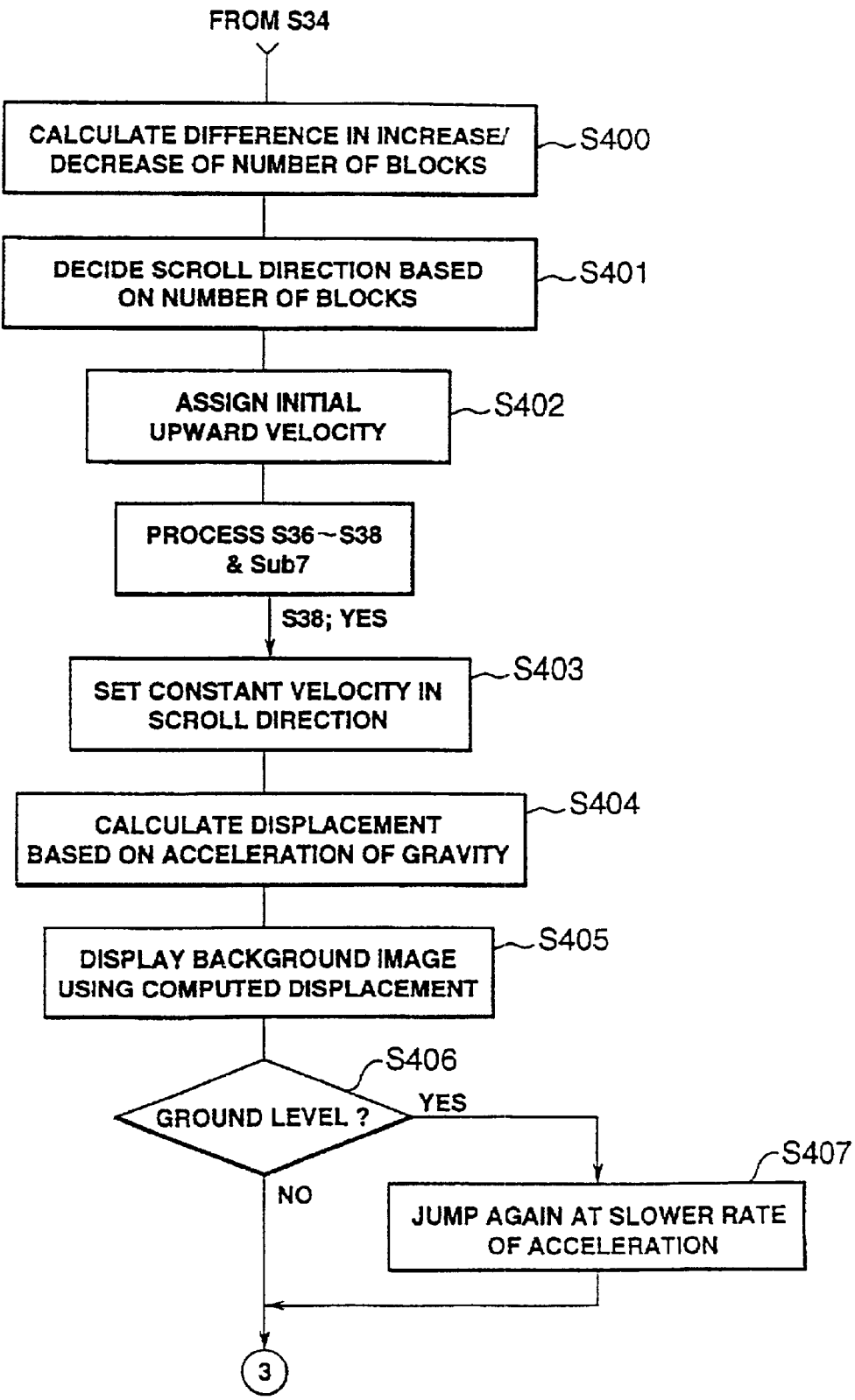
FIG. 28 depicts a flowchart explaining the background jump process.

FIG. 28 depicts a flowchart explaining background jump processing. This flowchart transposes a portion of the processing charted in FIG. 2. However, to simplify the explanation, the game processing apparatus does not sequentially process a plurality of playing areas as described in FIG. 2, but rather has as its premise the implementation of parallel processing, whereby the processing for the individual playing areas is executed independently and in parallel for each area. If parallel processing is implemented, there is no need for processing such as that explained in S38 and S40 of FIG. 2, whereby the program checks to determine whether or not all the processing in a playing area is done, and when it is done, shifts to the processing of the next playing area.

Based on the above-described premise, after step S34 in FIG. 2 is processed, the program shifts to the processing indicated in FIG. 28. When block deletion processing is performed in step S34, there is an increase or decrease in the difference in the number of blocks between the opposing playing areas. Therefore, firstly, the increase or decrease in the number of blocks in the respective playing areas is compared (S400). For example, the number of blocks in the playing area which received attack blocks during attack window processing/barrier block generation processing (Sub7) becomes plus, and the playing area where block chaining occurred, and the number of blocks decreased becomes negative. Even though mega-chaining decreases the blocks in a playing area, when mega-chaining in the opposing playing area increases the number of attack blocks, these numbers offset one another.

Figure 29:
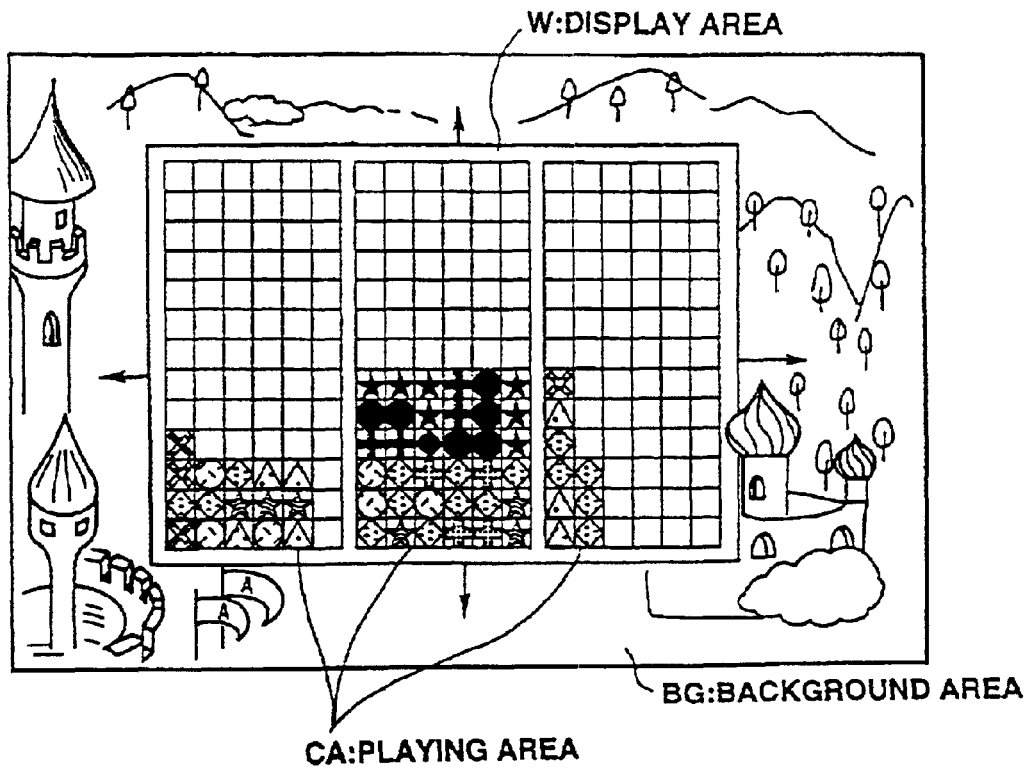
FIG. 29 illustrates the relationship between the display area and the background area.

The scroll direction is determined by the difference in the increase or decrease in the number of these blocks (S401). For example, when the number of blocks in the right-side playing area increases, the scroll direction is to the right. When the number of blocks in the left-side playing area increases, the scroll direction is to the left. When the number of blocks in the center playing area increases, scrolling does not occur. In this embodiment, when chaining occurs, the playing area display scrolls as if to jump relative to the background image. Therefore, the initial upward velocity applied to the playing areas at the outset is set (S402). Once the initial velocity is set, the cumulative processing of points scored by the deletion of blocks (S36), the determination as to whether or not the number of points exceeds the predefined value (S37), and finally, when the number of points exceeds the predefined value, the implementation of attack window processing (Sub7) are performed as explained in FIG. 2. FIG. 29 depicts the relationship between the background image data of the background area (background) (BG) and the window (W) that will actually be displayed on the monitor (5). As shown in this figure, the background area (BG) is the entire area for which background image data is provided. Conversely, the window (W) indicates the area within the background area which will actually be displayed on the display screen. Naturally, the background area (BG) is larger than the window (W). Because the playing areas (CA) are displayed on the display screen, they are displayed inside the window (W).

Next, the CPU (101) sequentially supplies to the video block (11) control information, which stipulates the plotting location of the window (W) relative to the background area (BG), and scrolls the playing areas (CA) within the background image. That is, when blocks are deleted, the playing areas (CA) are moved in the same manner as a prescribed elastic body subjected to parabolic movement. Therefore, a constant velocity is set for the established scroll direction (S403).

Then, when the initial velocity and constant velocity of the scroll direction described above are applied to an elastic body, it is presumed that the acceleration of gravity is added to this elastic body, and the displacement of this body is calculated (S404). The locus of this displacement is the parabolic movement. The window (W) is moved parallel to this locus. That is, the CPU (101) outputs control information that stipulates the display position of the background image corresponding to displacement, and displays the background image in that display location (S405). Since it is presumed that an elastic body has elasticity, it is determined whether or not the elastic body has reached the prescribed ground level location as a result of the above-described displacement (S406), and when it is determined that it has reached the ground level location (S46; Yes), it is made to jump up again at a smaller initial velocity than the previous jump, which should create the same locus as that of a jumping body (S407). When the above processing is complete, the first round of playing area processing is terminated and the program returns to block generation processing in FIG. 2. (FIG. 2; S21).

Figure 30:
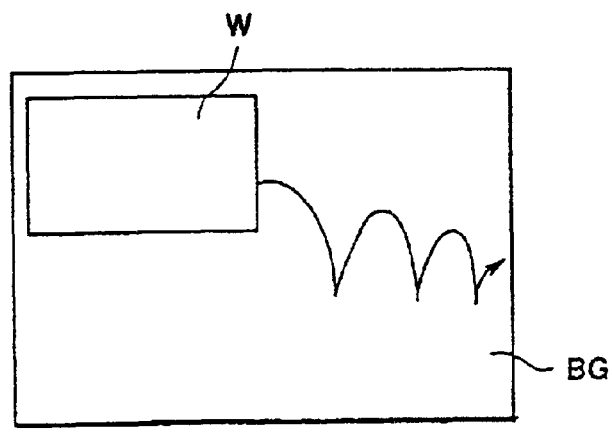
FIG. 30 illustrates the relative movement of the display area.

If this background jump processing is repeated, as shown in FIG. 30, the window (W) is displayed just as if it were an elastic body repeatedly jumping in the background image of the background area (BG).

(2-Against-1 Mode)

Since battle puzzle games ordinarily take the form of two players doing battle, the embodiment for the present invention also emulates this approach, but the provision of three playing areas can also be considered. When this is the case, thought can be given to a format wherein two players form a cooperative relationship and battle the CPU, or a format wherein one player cooperates with the CPU to attack the other player.

Figure 31:
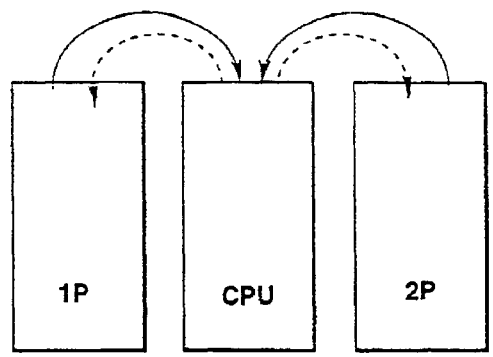
FIG. 31 illustrates the cooperative relationships of the playing areas (Situation 1)
Figure 32:
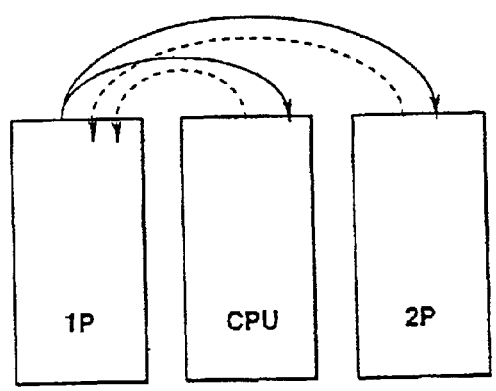
FIG. 32 illustrates the cooperative relationships of the playing areas (Situation 2)
Figure 33:
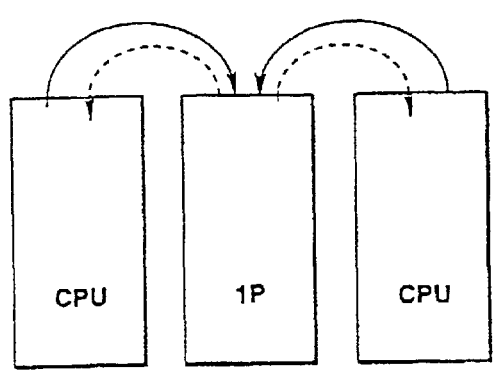
FIG. 33 illustrates the cooperative relationships of the playing areas (Situation 3)

FIG. 31 through FIG. 33 depicts the cooperative relationships developed at this time. The players manipulate their respective playing areas themselves, and all the barrier blocks generated in the two playing areas that are cooperating with one another are sent to the non-cooperating playing area. Conversely, the barrier blocks generated by the non-cooperating playing area are sent to the other two playing areas, with either the same number of blocks being sent to each, or the total number of blocks being equally divided between the two.

1. The above-described embodiments of the present invention offer the following advantages.
2. Victory declaration processing enables a declaration similar to the reach declaration in mahjong to be made, thereby making it possible to put pressure on one's opponent. Further, because manipulation becomes invalid when a victory declaration is made, if, despite having made a victory declaration, the player making that declaration cannot complete the game, his situation can suddenly change for the worse, providing unexpected enjoyment.
3. Because flash processing displays an image that flashes when a lot of chaining occurs, this makes it possible to warn the other player, who is absorbed in his own game play, that attack blocks are coming. This puts psychological pressure on the other player, and can make the game more interesting.
4. Because color change processing makes for beautiful image displays during chaining, and players never tire of playing the game.
5. Because scores are calculated in terms of the time required to reach the final stage rather than the number of blocks that disappear, time trials can be implemented using falling block-type puzzle games.

6. Because changing the story determination flag makes it possible to change the story that unfolds next in accordance with the time it takes to complete a stage, advanced players who finish a game stage quickly can be presented with a difficult brain next, and beginners who can only finish a stage slowly, can be presented with an easy brain next. This enables the provision of game play that corresponds to the skill levels of the players. Each player can enjoy the game at his own skill level.

7. With character selection processing, since character displays continue to change no matter how many times a game stage is repeated, play is enjoyable, and players never tire of playing the game.

8. Because background jump processing moves the background image in accordance with increases or decreases in blocks, players engrossed in their play can still learn whether or not the game play in their own playing area is giving them an advantage over their opponent, making it possible to increase the tension of the game.

9. Because players can use initial settings to arbitrarily select from among the three playing areas a partner with whom to form a cooperative relationship, it is possible to add the enjoyment of team play to falling block-type puzzle games, which in the past could only be played alone.

Industrial Applicability

By virtue of the present invention, when an operating signal equivalent to a victory declaration by a player manipulating a single playing area is input, a predetermined image is displayed, and subsequent input of operating signals to that playing area is prohibited. Therefore, since a declaration similar to the reach used in mahjong can be made, it is possible to put pressure on one's opponent. Further, because manipulation becomes invalid when a victory declaration is made, if, despite having made a victory declaration, the player making that declaration cannot complete the game, his situation can suddenly change for the worse, providing unexpected enjoyment.

By virtue of the present invention, because points are calculated at the end of the final game stage in accordance with the time that elapsed from the start of the first game stage to the end of the above-mentioned final game stage, it is possible to provide the entertainment of time trials, and to increase the players' incentive to play the game.

By virtue of the present inventions, when the game play in one playing area meets a predetermined condition, this changes the evolution of the game in the other playing area, thereby making it possible to provide the entertainment of a battle game to a game that is ordinarily played alone, and to increase the players' incentive to play the game.

By virtue of the present invention, when it is determined that game play has met a prescribed condition, this changes the manner in which the background image is displayed behind each of the playing areas, thereby making it possible for players engrossed in their play to learn how the match is going, i.e. whether or not the game play in their own playing area is giving them an advantage over their opponent, enabling the tension of the game to be increased.

By virtue of the present invention, when it is determined that game play has met a prescribed condition, this changes the chromaticness of each of the primary colors in the background image of the playing area concerned based on color change characteristic data, thereby making it possible to provide a beautiful image display that players never tire of looking at. Accordingly, players are able to increase their own incentive to play the game.

By virtue of the present invention, since options are displayed when a condition is met, it is possible for the players themselves to stipulate the contents of processing, thus adding new enjoyment to the game.

By virtue of the present invention, since the characters selected at each stage of the game are displayed differently according to their selection history, it is possible to arouse the interest of the players so they never tire of the game even if they play the same stage repeatedly.

What is claimed is:

1. A game apparatus comprising:
a memory for recording a program that displays a plurality of playing areas on a game screen and processes a battle game in accordance with operating signals that are generated based on operations of a plurality of players, wherein each player is located in one of the plurality of playing areas; and
a CPU block for processing the game based on the program,
wherein the CPU block comprises:
a first means for validating a victory declaration flag when a operating signal makes a declaration of victory of one of the plurality of players operating the game in one playing area among the plurality of playing areas on the basis of said program and the player's operations;
a second means for nullifying subsequent operating signals input in the one playing area after the declaration of victory, until a game stage ends when the victory declaration flag becomes valid in the one playing area among the plurality of playing areas;
a judging means for judging whether or not to continue processing in one of the other plurality of playing areas when a declaration of victory is not made;
an executing means for repeatedly executing the first means and the second means in an unprocessed playing area when such unprocessed playing area exists according to the judging means;
a settling means for settling game points for a one of the players declaring victory when the declaration of victory is made;
a settling means for settling game points in the playing are operated by another one of the players who does not make a declaration of victory when the game is over; and
a determining means for determining a winner of the game based on the game points; and
a timer for measuring a duration of the game,
wherein the CPU block stops the timer in the playing area where the declaration of victory is made after the victory declaration flag is validated.

2. The game apparatus according to claim 1,
wherein the battle game is a battle type dropping puzzle game displaying the plurality of playing areas so that displayed blocks move on the game screen by moving dropping blocks right or left in accordance with the operating signals generated by a player's operations in each playing area, and by causing blocks to disappear that meet predetermined conditions when they are landed and fixed, and
wherein the second means vertically drops the blocks and nullifies subsequent operating signals input in one of the plurality of playing areas after the declaration of victory until the game stage ends when the victory declaration flag is validated.

3. The game apparatus according to claim 1,
wherein the game points are determined in proportion to the duration of the game measured by the timer.

4. A data processing method for a battle game using a CPU block to process the battle game on the basis of a program, the method comprising:

displaying a plurality of playing areas on a game screen;

processing a battle game in accordance with operating signals that are generated based on operations of a plurality of players in one of the plurality of playing areas;

validating a victory declaration flag when an operating signal makes a declaration of victory of one of the plurality of players operating the game in one playing area among the plurality of playing areas on the basis of said program and the player's operations;

nullifying subsequent operating signals input in the one playing are after the declaration of victory, until a game stage ends when the victory declaration flag becomes valid in the one playing area among the plurality of playing areas;

judging whether or not to continue processing in one of the other plurality of playing areas when a declaration of victory is not made;

repeatedly performing the validating and the nullifying in an unprocessed playing area when such unprocessed playing area exists according to the judging means;

settling game points for the player declaring victory when the declaration of victory is made;

settling game points in the playing area operated by another one of the players who does not make a declaration of victory when the game is over;

determining a winner of the game based on the game points; and measuring a duration of the game with a timer, wherein the CPU lock stops the timer in the playing area where the declaration of victory is made after the victory declaration flag is validated.

5. The data processing method according to claim 4, further comprising:

displaying the battle game as a battle type dropping puzzle game including the plurality of playing areas where displayed blocks move on a game screen by moving dropping blocks right or left in accordance with the operating signals generated on the basis of a player's operations in each playing area, and by causing such locks to disappear that meet predetermined conditions when they are landed and fixed; and vertically dropping blocks and nullifying subsequent operating signals input in one of the playing areas after the declaration of victory until the game stage ends when the victory declaration flag is validated.

6. The data processing method according to claim 4, further comprising:

determining the game points in proportion to the duration of the game measured by the timer.

7. A computer readable medium storing a program executed by a CPU block and for executing instructions comprising the steps of:

displaying a plurality of playing areas on a game screen;

processing a battle game in accordance with operating signals that are generated based on operations of a plurality of players in one of the plurality of playing areas;

validating a victory declaration flag when an operating signal makes a declaration of victory of one of the plurality of players operating the game in one playing area among the plurality of playing areas on the basis of said program and the player's operations;

nullifying subsequent operating signals input in the one playing area after the declaration of victory, until a game stage ends when the victory declaration flag becomes valid in the one playing area among the plurality of playing areas;

judging whether or not to continue processing in one of the other plurality of playing areas when a declaration of victory is not made;

repeatedly performing the validating and nullifying steps in an unprocessed playing area when such unprocessed playing area exists according to the judging means;

settling game points for the player declaring victory when the declaration of victory is made;

settling game points in the playing area operated by another one of the players who does not make a declaration of victory when the game is over;

determining a winner of the game based on the game points; and measuring a duration of the game with a timer, wherein the CPU lock stops the timer in the playing area where the declaration of victory is made after the victory declaration flag is validated.

8. The computer readable medium according to claim 7, the instructions further comprising steps of:

displaying the battle game as a battle type dropping puzzle game including the plurality of playing areas where displayed blocks move on a game screen by moving dropping blocks right or left in accordance with the operating signals generated on the basis of a players operations in each playing area, and by causing such locks to disappear that meet predetermined conditions when they are landed and fixed; and vertically dropping blocks and nullifying subsequent operating sign is input in one of the playing areas after the declaration of victory until the game stage ends when the victory declaration flag is validated.

9. The computer readable medium according to claim 7, the instructions further comprising a step of:

determining the game points in proportion to the duration of the game measured by the timer.

10. A computer program embedded in a computer readable medium for executing instructions comprising the steps of:

displaying a plurality of playing areas on a game screen;

processing a battle game in accordance with operating signals that are generated based on operations of a plurality of players in one of the plurality of playing areas;

validating a victory declaration flag when an operating signal makes a declaration of victory of one of the plurality of players operating the game in one playing area among the plurality of playing areas on the basis of said program and the player's operations;

nullifying subsequent operating signals input in the one playing area after the declaration of victory, until a game stage ends when the victory declaration flag becomes valid in the one playing area among the plurality of playing areas;

judging whether or not to continue processing in one of the other plurality of playing areas when a declaration of victory is not made;

repeatedly performing the validating and nullifying steps in an unprocessed playing area when such unprocessed playing area exists according to the judging means;

settling game points for the player declaring victory when the declaration of victory is made;

settling game points in the playing area operated by another one of the players who does not make a declaration of victory when the game is over;

determining a winner of the game based on the game points; and measuring a duration of the game with a timer, wherein the time is stopped in the playing area where the declaration of victory is made after the victory declaration flag is validated.

11. The computer program according to claim 10, the instructions further comprising steps of:

displaying the battle game as a battle type dropping puzzle game including the plurality of playing areas where displayed blocks move on a game screen by moving dropping blocks right or left in accordance with the operating signals generated on the basis of a player's operations in each playing area, and by causing such locks to disappear that meet predetermined conditions when they are landed and fixed; and vertically dropping and nullifying subsequent operating signals input in one of the playing areas after the declaration of victory until the game stage ends when the victory declaration flag is validated.

12. The computer program according to claim 10, the instructions further comprising a step of:

determining the game points in proportion to the duration of the game measured by the timer.

* * * * *

UNITED STATES PATENT AND TRADEMARK OFFICE
CERTIFICATE OF CORRECTION

PATENT NO.    : 6,827,645 B2
DATED         : December 7, 2004
INVENTOR(S)   : Masamoto Morita et al.

It is certified that error appears in the above-identified patent and that said Letters Patent is hereby corrected as shown below:

Column 22,
Line 24, "a operating" should read -- an operating --.
Line 45, "are" should read -- area --.

Column 23,
Line 19, "are" should read -- area --.
Line 38, "lock" should read -- block --.
Line 49, "locks" should read -- blocks --.

Column 24,
Line 27, "lock" should read -- block --.
Line 37, "players" should read -- player's --.
Line 39, "locks" should read -- blocks --.
Line 42, "sign is" should read -- signals --.

Column 26,
Line 7, "locks" should read -- blocks --.

Signed and Sealed this

Seventh Day of June, 2005

JON W. DUDAS
*Director of the United States Patent and Trademark Office*